(12) United States Patent
Kathirgamanathan et al.

(10) Patent No.: US 6,441,124 B1
(45) Date of Patent: Aug. 27, 2002

(54) POLYMERS

(75) Inventors: Poopathy Kathirgamanathan, Middlesex; Subramaniam Ganeshamurugan, Surrey, both of (GB)

(73) Assignee: Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 09/585,570

(22) Filed: Jun. 2, 2000

(30) Foreign Application Priority Data

Jun. 2, 1999 (GB) ............................................. 9912841

(51) Int. Cl.[7] ............................................. C08G 12/00

(52) U.S. Cl. ..................... 528/229; 528/220; 528/222; 528/225

(58) Field of Search ................. 528/220, 222, 528/225, 229

(56) References Cited

U.S. PATENT DOCUMENTS

| | | | |
|---|---|---|---|
| 3,301,827 A | | 1/1967 | Martin |
| 4,102,873 A | | 7/1978 | Griffith et al. ............... 528/331 |
| 5,393,612 A | * | 2/1995 | Matsuura et al. ......... 428/423.1 |
| 6,153,726 A | * | 11/2000 | Kathirgamanathan et al. ............. 528/422 |

FOREIGN PATENT DOCUMENTS

| | | |
|---|---|---|
| EP | 0 053 937 | 6/1982 |
| EP | 0 295 676 | 12/1988 |
| GB | 2 350 617 | 12/2000 |
| JP | 60-036519 | 2/1985 |

(List continued on next page.)

OTHER PUBLICATIONS

M. A. Rabjohns, et al., Polymer, vol. 38, No. 13, 2 pages, "Sintesis of Aromatic Polyamides Containing Anthracene Units Via a Precursor Polymer Approach", 1997 (Abstract only).

R. N. Nurmukhametov, et al., Zh. Fiz. Khim., vol. 70, No. 10, 1 page, "Effect of Substituents on Luminescence Spectral Properties of 9, 10–Diphenylanthrancene Derivatives", 1996 (Abstract only).

(List continued on next page.)

Primary Examiner—Samuel A. Acquah
(74) Attorney, Agent, or Firm—Oblon, Spivak, McClelland, Maier & Neustadt, P.C.

(57) ABSTRACT

There are disclosed polymeric or oligomeric product obtainable from the reaction of an anthraquinone with an aromatic diamine, characterised in that the anthraquinone is substituted or is not substituted and in that the diamine is a diamino anthracene which is substituted or is not substituted.

The anthraquinone may be of the general formula (I):

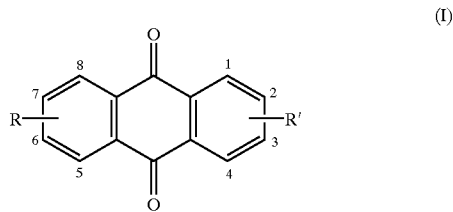

where, R may be the same as or different to R', and may be a hydrogen atom (when R=R'=H, the compound is anthraquinone), or $CH_3$, $CH_3CH_2-$, $-OCH_3$, $-OCH_2CH_3$, $-CH_2OCH_3$, $-CH_2OCH_2CH_2OCH_3$, methoxyethoxyethoxymethyl, aryloxymethyl, phenyl, Cl, Br, CN or $NO_2$, $-CH_2COOR$ or $CH_2NHCOR''$ (where R'' is $C_1-C_6$ alkyl or a phenyl or biphenyl group).

34 Claims, 13 Drawing Sheets

FOREIGN PATENT DOCUMENTS

| JP | 60-135419 | 7/1985 |
|----|-----------|--------|
| JP | 60-135420 | 7/1985 |

OTHER PUBLICATIONS

A. H. Frazer, et al., J. Polym. Sci., Polym. Chem. Ed., vol. 23, No. 11, 1 page, "Polyamides from 2, 6 (7)–Diamino–9, 10–Dihydro–9, 10–Ethanoanthracene and 2, 6 (7)–Diaminoanthracene", 1985 (Abstract only).

Derwent Publications, AN 1991–129168, JP 3 038623, Mar. 25, 1991.

A.H. Frazer, et al., J. Polym. Sci., vol. 23, No. 11, 1 page, "Polyamides From 2,6(7)–Diamino–9, 10–Dihydro–9, 10–Ethanoanthracene and 2,6(7)–Diaminoanthracene," 1995 (English Abstract Only).

* cited by examiner

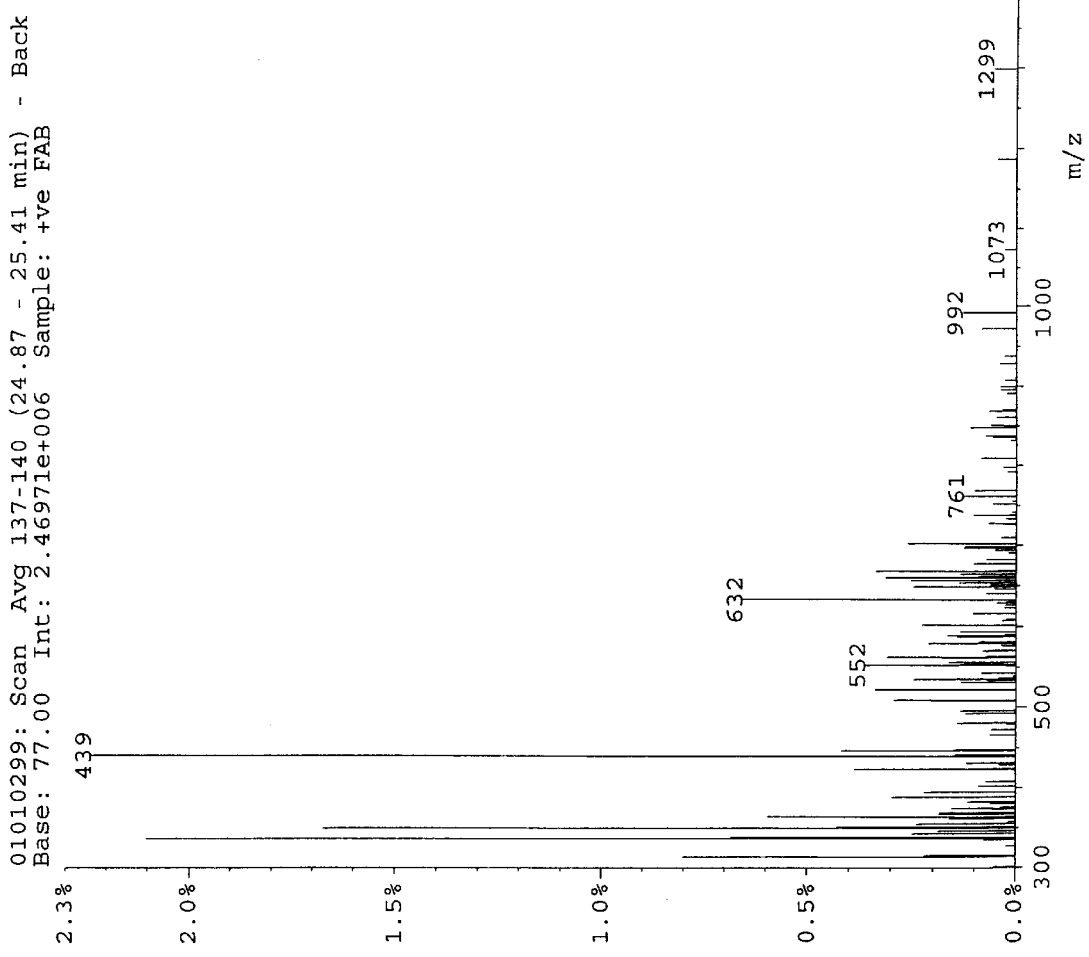

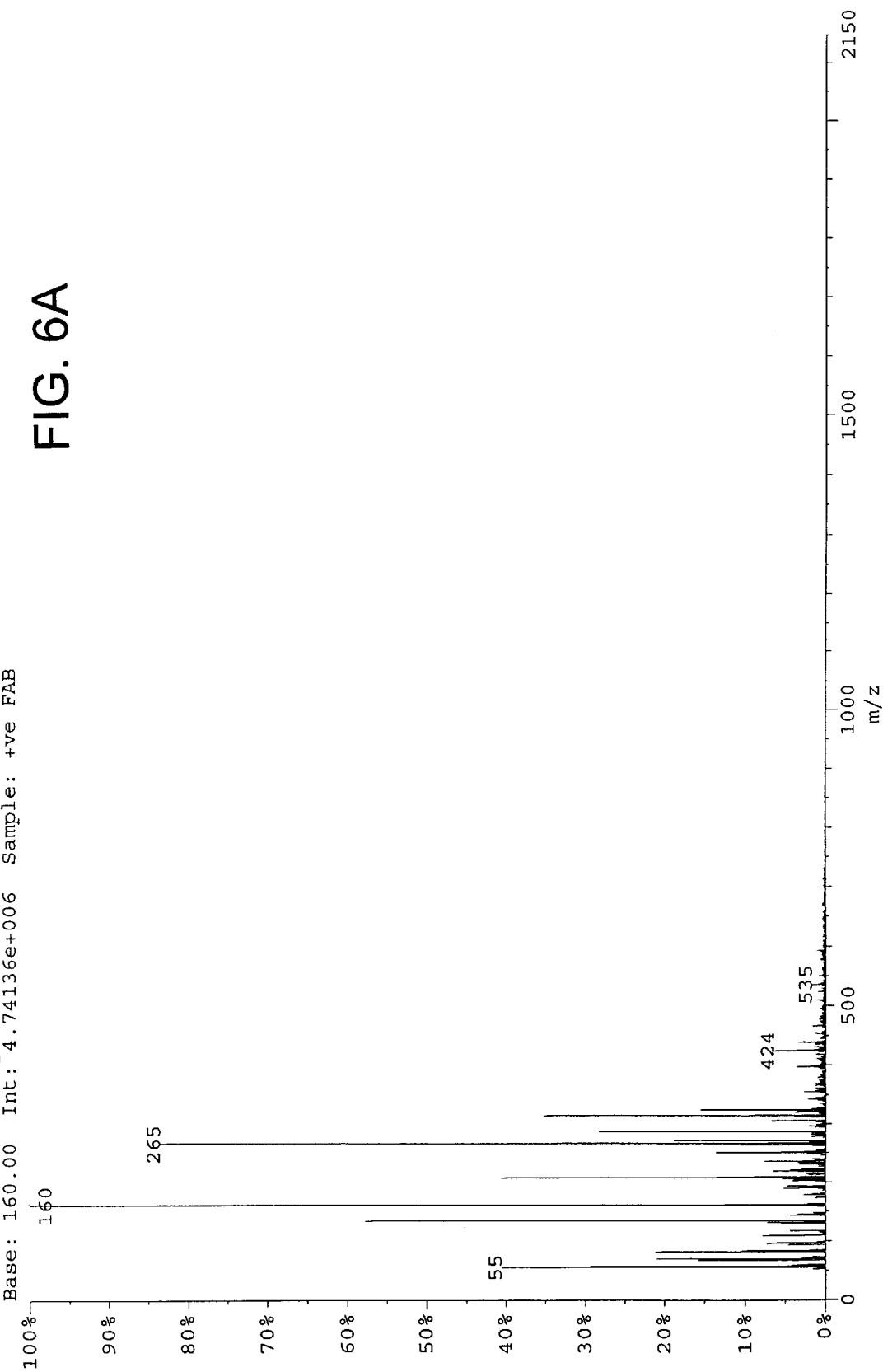

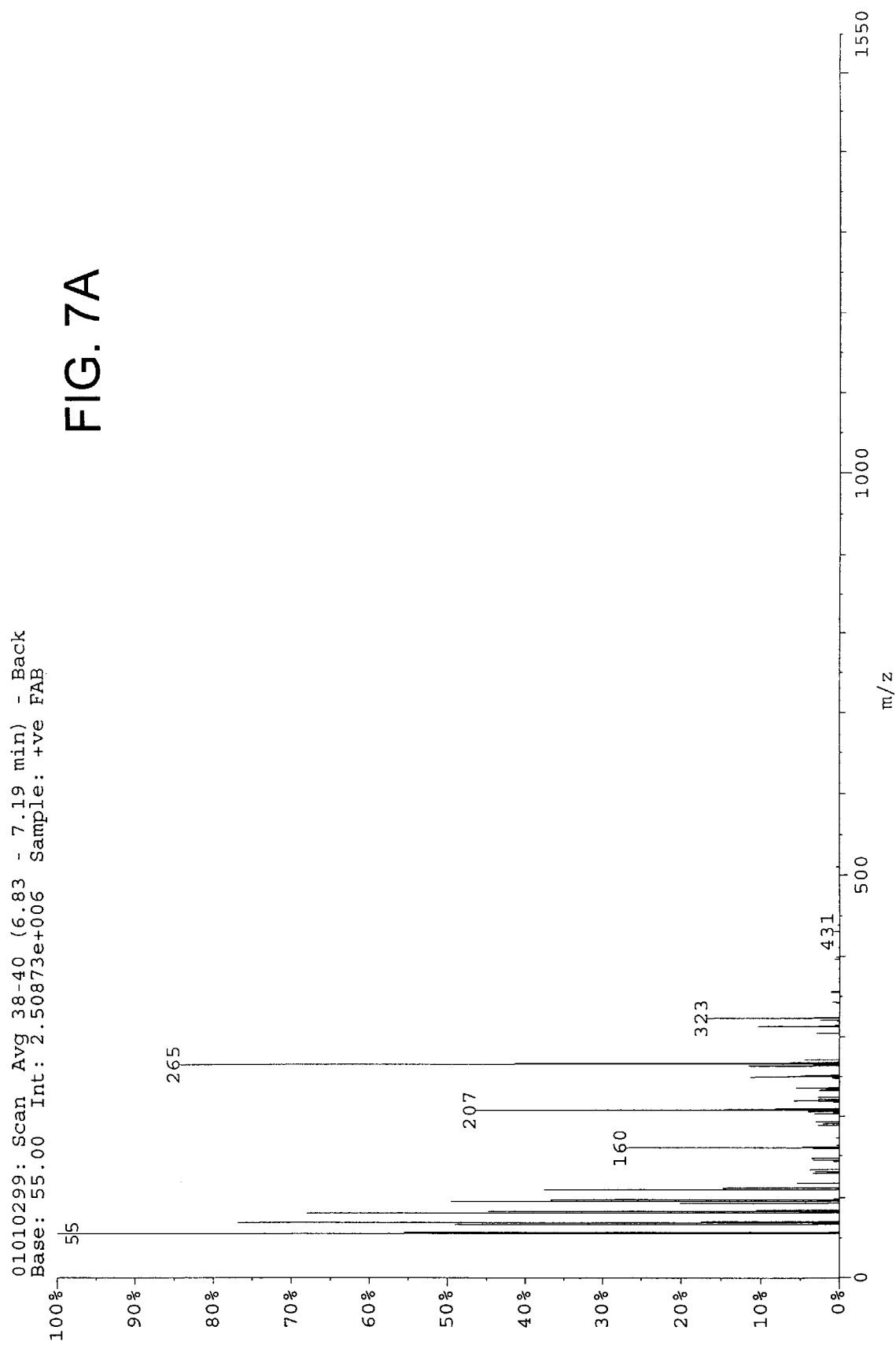

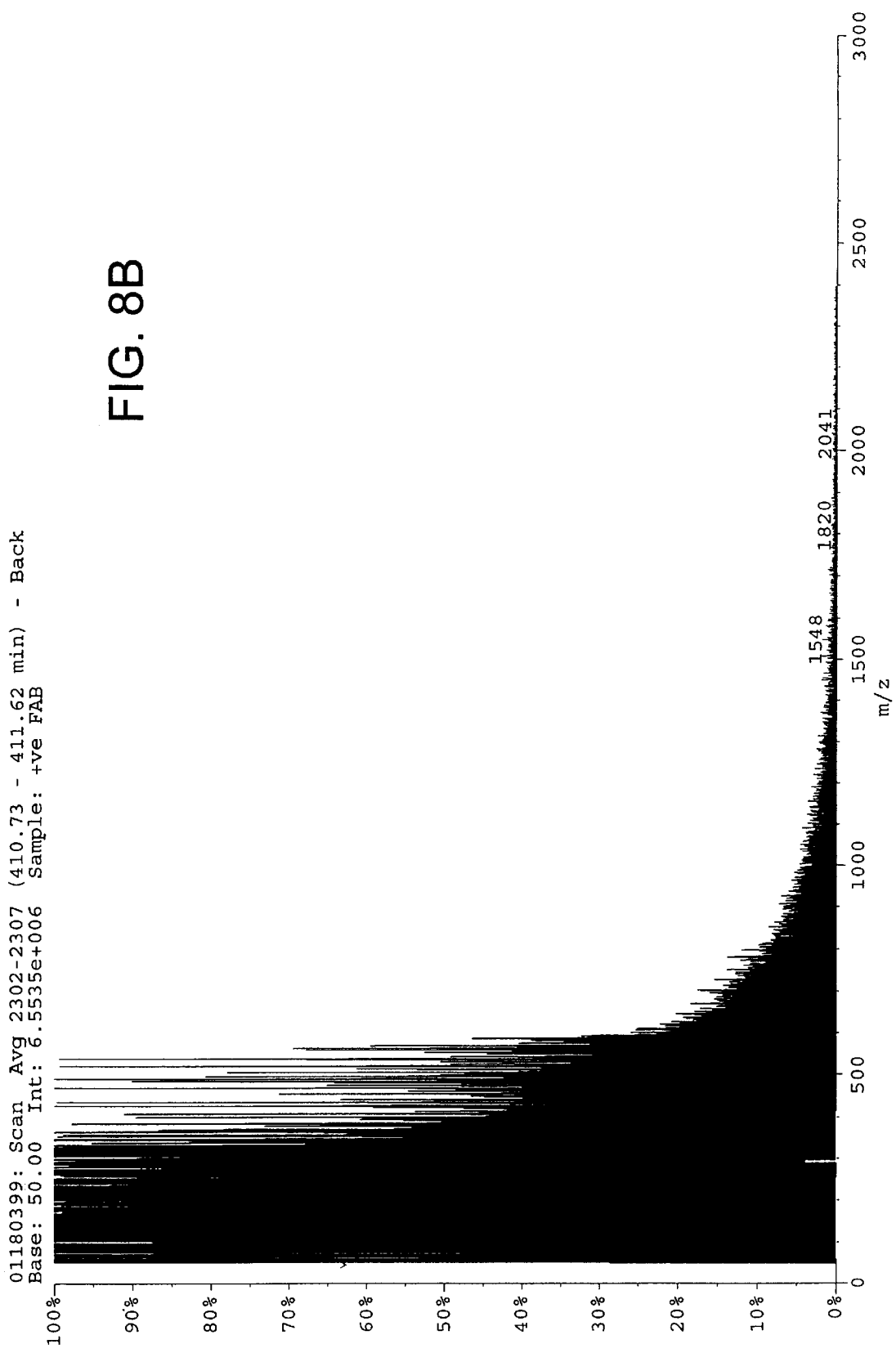

POLYMERS

A preferred product has the general formula III

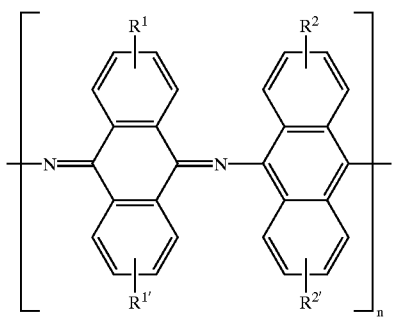

(III)

where, $R^1$ may be the same as or different to $R^{1'}$, which may be the same as or different to $R^2$, which may be the same as or different to $R^{2'}$ and is a hydrogen atom or $CH_3$, $CH_3CH_2$, $—OCH_3$, $—OCH_2CH_3$, $—CH_2OCH_3$, $—CH_2OCH_2CH_2OCH_3$, methoxyethoxyethoxymethyl, aryloxymethyl, phenyl, Cl, Br, CN or $NO_2$, $—CH_2COOR$ or $—CH_2NHCOR'''$ (where $R'''$ is $C_1–C_6$ alkyl or a phenyl or biphenyl group), or a $C_1–C_5$ alkyl group, or an aryl group e.g. a benzyl group, or an $—SO_3H$ group or a hydroxyl group or a $C_1–C_5$ alkoxy group or an $H_2PO_3$ group, and $R^1$ and $R^{1'}$ are different to $R^2$ and $R^{2'}$ and n is an integer ranging from 10 to 100.

POLYMERS

The present invention relates to polymerisation products of anthraquinone (AQ) with diamino anthracenes (DAA) and to their production. In particular, the invention relates to homopolymers or co-polymers of anthraquinone with 9,10 diaminoanthracene. The polymerisation products may be polymers or oligomers (e.g. of 2 to 12 or 15 repeat units) and the processes of the present invention enables homopolymers and co-polymers to be made which differ only in the substituents which are attached to the anthracene backbone. The co-polymers can be expected on reduction to produce materials which are electroconductive and fairly soluble in a range of commercially viable and environmentally friendly organic solvents. They may also be sufficiently transparent to be used in thin film applications where they may be used as transparent coatings, used extensively in displays, e.g. electroluminescent and liquid crystal displays and to some extent in electromagnetic shielding windows. The copolymers disclosed herein can be used in antistatic applications.

Polymers of aniline and applications thereof have been known for many years. Poly (1-aminoanthracene) (P1-AA hereafter) has also been described recently (Takakazu Yamamoto et al., *Macromolecules*, 1993, 26, pages 6992–6997). These polymers have similar structures to poly(aniline) and are dark coloured, varying from bluish-black, brown to brown-black powders. Yamamoto states P1-AA has conductivity of the order of $1×10^{-4}$ S cm$^{-1}$. P1-AA is stated by Yamamoto to be soluble in organic solvents such as HCOOH, DMF, DMSO and NMP, slightly soluble in $CHCl_3$ and THF, and insoluble in $CH_3OH$, $C_2H_5OH$, $CH_3CN$, benzene and toluene. Yamamoto gives no indication of the transparency of P1-AA. The applicants are also aware of two articles namely A. Everaerts et al., *Polym. Prepr.* (Am. Chem. Soc., Div. Polym. Chem.) 24 (7) pp 1703–16 (1986) (hereafter Everaerts) and P. A. Williams et al, *Macromolecules* 26 (21) pp5820-1 (1993) (hereafter Williams)

The present inventors have been seeking to develop a conductive polymer of sufficient transparency to enable it to be used where light transmission as well as conductivity is required, and in addition solubility which would facilitate fabrication into useful structures, such as films, by solvent methods. In contrast to P1-AA we have discovered surprisingly that certain polymerisation products of anthraquinone with 9,10 diaminoanthracene are sufficiently transparent and soluble electroconductive polymers.

These products may exhibit a particular advantage over the transparent Indium Tin Oxide (ITO) films currently employed in transparent coatings. The ITO coatings lose most or all of their electroconductivity if the surface is bent. However, the products according to the present invention can be expected to maintain their electroconductivity even when bent.

In addition the present inventors wished to devise a procedure by which polymers could be provided in which the polymer backbone was constant and maximum flexibility was provided for varying the substitution on the backbone.

According to one aspect of the present invention, there is provided a polymeric or oligomeric product obtainable from the reaction of an anthraquinone with an aromatic diamine, characterised in that the anthraquinone is substituted or is not substituted and in that the diamine is a diamino anthracene which is substituted or is not substituted. These are preferably produced by polycondensation.

The substitution may be such that the product is a homopolymer or homo-oligomer, or the substitution may be such that the product is a co-polymer or a co-oligomer.

The diaminoanthracene is preferably a 9,10-diaminoanthracene, which may be substituted or not.

The DAA may be substituted with a single substituent e.g. a $C_1–C_5$ alkyl, an aryl e.g. a benzyl group, an $—SO_3H$, or $—OH$, or $C_1–C_5$ alkoxy, or aryloxy, e.g. phenoxy or substituted phenoxy or biphenyloxy group or an $H_2PO_3$ group or with more than one substituent.

The invention also extends to products in which the anthraquinone is replaced wholly or in part by one or more substituted anthraquinones. Commercially available substituted anthraquinones include:

1-methylaminoanthraquinone;
2-aminoanthraquinone;
1-aminoanthraquinone;
9,10-Anthraquinone-2-sulphonic acid sodium salt;
9,10-Anthraquinone-1,5-disulphonic acid disodium salt;
1-chloroanthraquinone
2-Methylanthraquinone;
2-Ethylanthraquinone;
9,10-Anthraquinone-2,6-disulphonic acid disodiun salt;
2-(Hydroxymethyl)anthraquinone;
Anthraquinone-2-carboxylic acid, (contains 98% 9,10-dihydro-9,10-dioxo-2-anthracenecarboxylic acid)
1,5 dihydroxyanthraquinone;
1,4 dihydroxyanthraquinone;
1,4-Bis(methylamino)anthraquinone;
Benz[a]anthracene-7,12-dione;
1,4-Diaminoanthraquinone;
1,5-Dichloroanthraquinone;
1,5-Dinitro-9,10-anthraquinone;
2,3,6,7-Tetramethyl-anthraquinone;
1-Hydroxy-4-(paratoluidine)anthraquinone;
1-Alkyloxy-3-methoxymethoxy-anthraquinone;
2,6-Di-tert-butyl-anthraquinone;

1-Amino-2-bromo-4-p-tolylamino-anthraquinone;
1-Hydroxy-2-pent-2-enyl-anthraquinone;
1-Amino-4-hydroxy-anthraquinone;
2-[(2-Amino-ethylamino)-methyl]-anthraquinone, dihydrobromide;
1,4-Dimethyl-anthraquinone;
1,4-Diamino-2,3-bis-phenoxy-anthraquinone;
2,7-Dimethyl-anthraquinone;
1,2-Dimethyl-anthraquinone;
1-Iodo-2-methyl-anthraquinone;

The ratio of anthraquinone to aromatic diamine is in the range preferably of 5:1 to 1:5, eg. in the range 3:1 to 1:3, more preferably in the range 2:1 to 1:2, e.g. 1:1. Preferably the anthraquinone is a $C_1$–$C_6$ alkyl anthraquinone or a $C_1$–$C_{10}$ alkoxy anthraquinone or a hydroxyanthraquinone, for example the anthraquinone may be 2-ethyl anthraquinone or 2-methyl anthraquinone, or 2,3-dimethyl anthraquinone or 2,6-dioctyloxy anthraquinone or 2,6-dihydroxyanthraquinone.

The diaminoanthrance may be substituted in the same way as the anthraquinone and with the same range of substituents.

Preferred substituted anthraquinones are $C_1$–$C_6$ alkyl anthraquinones e.g. 2-ethyl anthraquinone or 2-methyl anthraquinone, or 2,3-dimethyl anthraquinone or $C_1$–$C_{10}$ alkoxy anthraquinones e.g. 2,6-dioctyloxy anthraquinone or hydroxyanthraquinones e.g. 2,6-dihydroxyanthraquinone.

More broadly, the substituted anthraquinones may be of general formula (1):

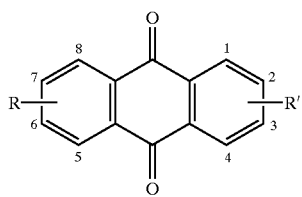

(I)

where, R may be the same as or different to R', and may be a hydrogen atom (when R=R'=H, the compound is anthraquinone), or $CH_3$, $CH_3CH_2$—, —$OCH_3$, —$OCH_2CH_3$, —$CH_2OCH_3$, —$CH_2OCH_2CH_2OCH_3$, methoxyethoxyethoxymethyl, aryloxymethyl, phenyl, Cl, CN or $NO_2$, —$CH_2COOR$ or —$CH_2NHCOR''$ (where R'' is $C_1$–$C_6$ alkyl or a phenyl or biphenyl group).

The invention also extends to polymeric products having the general formula

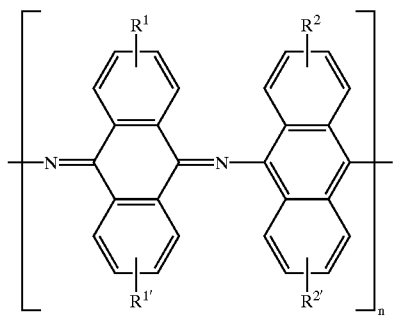

(II)

where, $R^1$ may be the same as or different to R', which may be the same as or different to $R^2$, which may be the same as or different to $R^{2'}$, and each of $R^1$,$R^{1'}$,$R^2$ and $R^{2'}$ may be a hydrogen atom or $CH_3$, $CH_3CH_2$—, —$OCH_3$, —$OCH_2CH_3$, —$CH_2OCH_3$, —$CH_2OCH_2CH_2OCH_3$, methoxyethoxyethoxymethyl, aryloxymethyl, phenyl, Cl, CN or $NO_2$, —$CH_2COOR$ or —$CH_2NHCOR'''$ (where R''' is $C_1$–$C_6$ alkyl or a phenyl or biphenyl group), or a $C_1$–$C_5$ alkyl group, or an aryl group e.g. a benzyl group, or an —$SO_3H$ group or a hydroxyl group or a $C_1$–$C_5$ alkoxy group or an $H_2PO_3$ group, and $R^1$ and $R^{1'}$ are different to $R^2$ and $R^{2'}$ and n is an integer ranging from 2 to 100 preferably from 10 to 100, preferably 50 to 80, e.g. about 70.

The invention also extends to polymeric products having the general formula (II)

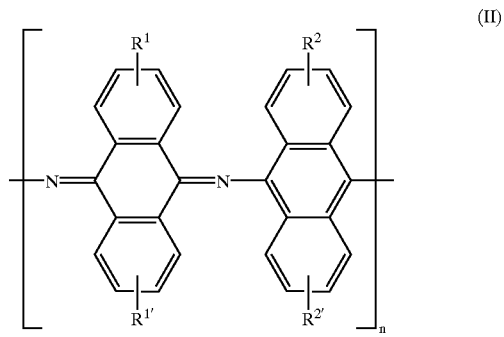

(II)

where, $R^1$ may be the same as or different to $R^{1'}$, and each of $R^1$ and $R^{1'}$ is a hydrogen atom or $CH_3$, $CH_3CH_2$, —$OCH_3$, —$OCH_2CH_3$, —$CH_2OCH_3$, —$CH_2OCH_2CH_2OCH_3$, methoxyethoxyethoxymethyl, aryloxymethyl, phenyl, Cl, CN or $NO_2$, —$CH_2COOR$ or —$CH_2NHCOR'''$ (where R''' is $C_1$–$C_6$ alkyl or a phenyl or biphenyl group), and $R^2$ may be the same or different to $R^{2'}$ and each of $R^2$ and $R^{2'}$ is a hydrogen atom or a $C_1$–$C_5$ alkyl group, or an aryl group e.g. a benzyl group, or an —$SO_3H$ group or a hydroxyl group or a $C_1$–$C_5$ alkoxy group or an $H_2PO_3$ group, and $R^1$ and $R^{1'}$ are different to $R^2$ and $R^{2'}$ and n is an integer ranging from 2 to 100 preferably from 10 to 100.

In one form of the invention $R^1$ is the same as $R^{1'}$ but is different from $R^2$ and $R^{2'}$ and in that $R^2$ and $R^{2'}$ are the same, i.e. a copolymeric form.

In another form of the invention $R^1$ is the same as $R^{1'}$ and as $R^2$ and $R^{2'}$ but is not hydrogen, i.e. a homopolymeric form.

In another form of the invention $R^1$ is different from $R^{1'}$ and $R^2$ is different from $R^{2'}$ and $R^1$ and $R^{1'}$ are both different from $R^2$ and $R^{2'}$, i.e. a copolymeric form.

In another form of the invention $R^1$ and $R^2$ are not hydrogen and $R^{1'}$ and $R^{2'}$ are not the same, i.e. a copolymeric form.

Poly (9-aminoanthracene)s) in accordance with the invention are also provided characterised in that they have an oxidation state between 0.25 to 0.75, and a formula (III) at an oxidation state 0.25, a formula (IV) at an oxidation state 0.5 and a formula (V) at an oxidation state 0.75 as follows

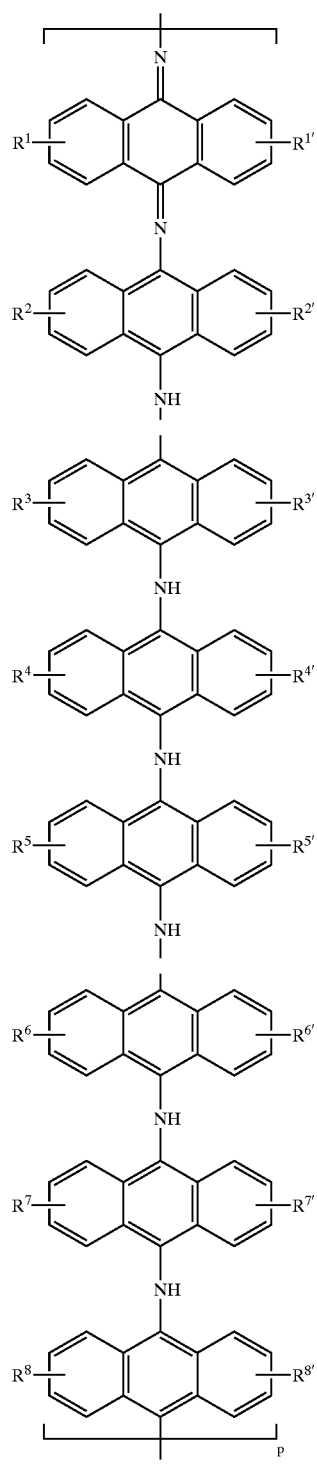 (III)
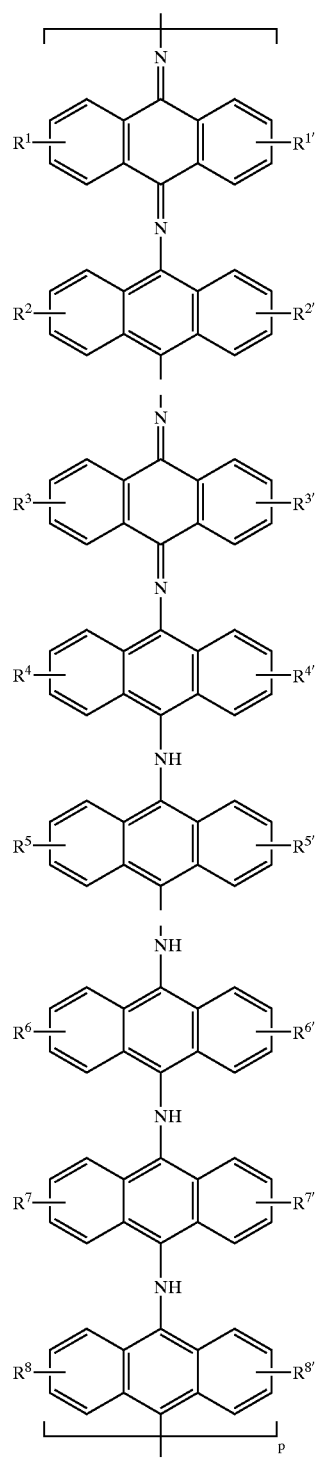 (IV)

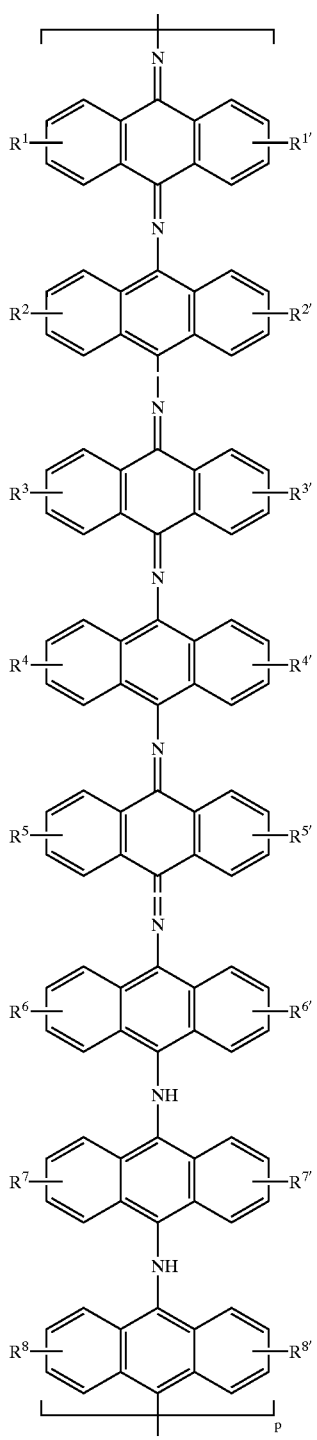

(V)

in which $R^1$ to $R^8$ are not all hydrogen, and $R^1$, $R^3$, $R^5$ and $R^7$ and $R^{1'}$, $R^{3'}$, $R^{5'}$ and $R^{7'}$ are the same as $R^1$ and $R^{1'}$ as defined in connection formula (II), and $R^2$, $R^4$, $R^6$ and $R^8$ and $R^{2'}$, and $R^{4'}$, and $R^{6'}$ and $R^{8'}$ are the same as $R^2$ and $R^{2'}$ as defined in connection with formula (II) and p is an integer ranging from 10 to 100.

Poly (9-aminoanthracenes) in accordance with the invention are also provided characterised in that they have an oxidation state between 0.25 to 0.75, and a formula (III) at an oxidation state 0.25, a formula (IV) at an oxidation state 0.5 and a formula (V) at an oxidation state 0.75 as follows

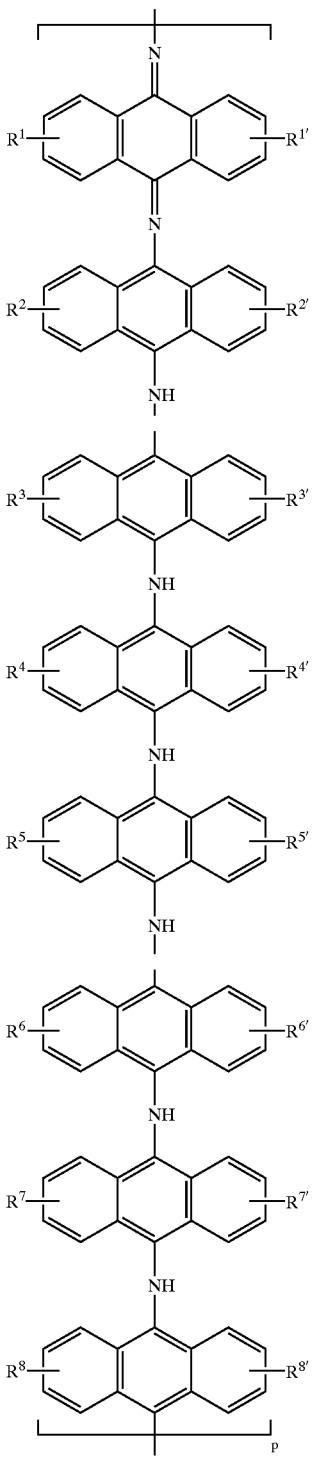

(III)

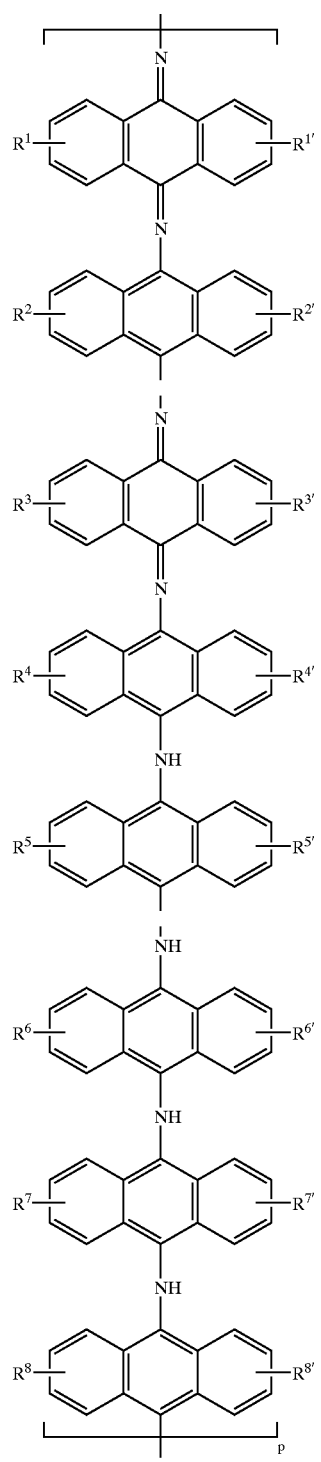
(IV)
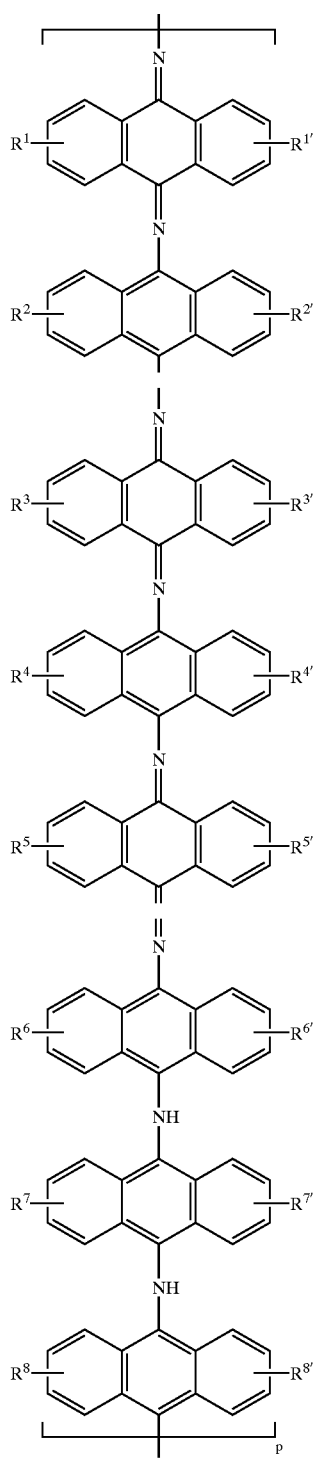
(V)

in which the R groups are the same as the R' groups and the R groups are all the same; or the R groups are the same as the R' groups and the $R^1$, $R^3$, $R^5$ and $R^7$ groups are all the same and the $R^2$, $R^4$, $R^6$ and $R^8$ groups are all the same but are different to the $R^1$, $R^3$, $R^5$ and $R^7$ groups; or the R groups are different to the R' groups and the $R^1$, $R^3$, $R^5$ and $R^7$ groups are all the same and the $R^2$, $R^4$, $R^6$ and $R^8$ groups are all the same but are different to the $R^1$, $R^3$, $R^5$ and $R^7$ groups, and $R^1$, $R^3$, $R^5$ and $R^7$ and $R^{1'}$, $R^{3'}$, $R^{5'}$ and $R^{7'}$ are the same as $R^1$ and $R^{1'}$ as defined in connection formula (II), and $R^2$, $R^4$, $R^6$ and $R^8$ and $R^{2'}$, and $R^{4'}$, and $R^{6'}$ and $R^{8'}$ are the same as $R^2$ and $R^{2'}$ as defined in connection with formula (II) and p is an integer ranging from 10 to 100.

Polymers with lower values of p, e.g. 2 to 10, or 2–15 which may be referred to as oligomers, will have higher solubility but may have lower heat stability.

The co-polymers of the invention can be expected on reduction to produce materials which are conductive and therefore may find uses in thin film technology, as EMI, RFI (electro magnetic interference, radio frequency interference) shielding materials and in display systems, such as electroluminescent and liquid crystal display systems as a transparent electrode.

The copolymers disclosed herein can be used even without reduction in antistatic applications.

Such reduced polymeric products may be used with other polymers (or binders). The polymeric product—binder blend may comprise from 5 to 70% by weight of the polymeric product and from 95 to 30% by weight of the other polymer. The polymer with which the polymeric product is blended may be, for example, poly(vinyl chloride), polyethylene, polypropylene, polystyrene, nylon, poly(acrylonitrile-butadiene-styrene), poly(ethylene terephthalate), poly(ethylene oxide), polymethyl methacrylate, polyether sulphone, polyether ketone, polytetrafluoroethylene.

These blends may have sufficient conductivities to give good antistatic properties at the lower concentrations of polymeric product. At the higher concentrations the blends may possess levels of conductivity which may be useful for shielding.

Furthermore, the polymeric product imparts the required electrical property to the blend immediately and unlike alkylammonium salts, do not need moisture to impart conductivity to the polymer.

Conductive adhesives may be formulated using the polymeric product of the present invention.

The polymeric product of the present invention may also be directly deposited chemically or electrochemically onto and/or impregnated into a porous polymer film such as poly(vinyl chloride), poly(carbonate) or poly(propylene). The surface of a component so formed can be permanently conductive and may have good antistatic properties.

This surface may be painted with coloured dyes or pigments and the colour modified without impairing the antistatic properties. This method may enable antistatic floors and mats to be fabricated from the composites.

Furthermore, non-conductive materials such as talc or mica may be coated with the polymeric product of the invention either chemically or electrochemically. Such coated powders may be useful as fillers for the formation of conductive polymer composites.

Furthermore, solutions of the solvent soluble polymeric product may be sprayed onto a non-conducting surface which can then become conductive on evaporation of the solvent therefrom. The resulting film can be used in display devices.

The invention also extends to a method of production of a homopolymer or copolymer or homo-oligomer or co-oligomer product characterised in that the product is obtained by condensation of an anthraquinone, substituted or not with a diaminoanthracene. substituted or not. Thus the polymeric product of the present invention may be prepared by the polycondensation of anthraquinone with DAA e.g. 9,10 diaminoanthracene using a titanium compound as a condensing agent. Examples of suitable titanium compounds include titanium tetrachloride and titanium alkoxides such as titanium tetraisopropoxide and titanium tetra-n-butoxide. Typically, a hindered base is also present in the reaction. Examples of such bases include 1,4-diazabicyclo[2,2,2]octane (Dabco), 1,8-diazabicyclo[5,4,0]undec-7-ene (DBU) and quinuclidine. Lewis acids, such as molybdenum pentachloride, aluminium chloride and ruthenium trichloride, may also be employed.

Preferably the diamino anthracene is dissolved in a suitable solvent and is heated with the titanium compound and a hindered base, the anthraquinone compound is added to the mixture and the mixture is stirred and heated e.g. for a period in excess of 12 hours, the mixture is filtered and the residue is washed and the product is purified.

Preferably the ratio of anthraquinone to DAA is in the range 5:1 to 1:5, more preferably in the range 3:1 to 1:3 and most preferably in the range 2:1 to 1:2, e.g. 1:1.

An alternative reaction procedure is merely to heat the anthraquinone and the DAA together e.g. in the presence of a solvent but in the absence of a catalyst or any other species e.g. used to facilitate condensation. This produces purer species but at lower yields as compared to catalysed reaction systems.

If substituted anthraquinones are used then low yields can be tolerated because one can recover unreacted substituted anthraquinones and moreover DAA by differential solubilisation using different solvents to dissolve out these soluble species e.g. sequentially.

The polymeric products produced may be dissolved in common organic solvents such as chloroform, or tetrahydrofuran and may also be processable into thin films. It is also possible to partially reduce the produced polymeric products with a suitable reducing agent, for example sodium cyanoborohydride, sodium borohydride, sodium borohydride-boron trifluoride etherate, lithium aluminium hydride, hydrazine and dithionites. These partially reduced polymeric products may have a lighter colour and sufficient electroconductivity to be used in transparent thin film technology. It is also possible to dope these polymeric products with suitable acid dopants, for example camphorsulphonic acid, 5-sulphosalicylic acid, para-toluenesulphonic acid, trifluoromethanesulphonic acid (triflic acid), methanesulphonic acid, trifluoroacetic acid, hydrochloric acid and sulphuric acid. This may enhance the electroconductivity of the polymeric product.

The invention also extends to a transparent electroconductive coating or to a static shielding material comprising a product in accordance with the present invention.

The invention also extends to a process which comprises reacting a lithium salt of DAA substituted or not with an anthraquinone substituted or not. In a preferred form of this aspect the invention also extends to a method in which DAA substituted or not is reacted in a solvent under inert gas with an organolithium compound, e.g. n-butyllithium or lithium diisopropyl amide, at low temperature, at which the resulting lithium DAA salt is stable, preferably −70° C. or lower, but above the freezing point of the reaction mixture, to produce a DAA lithium salt, the temperature of the reaction mixture is then allowed to rise e.g. to at least −20° C., preferably to room temperature and the reaction mixture is then added to anthraquinone, substituted or not, and the reaction allowed to occur, preferably at elevated temperature, e.g. by refluxing, to remove the water produced in the condensation reaction from the reaction mixture.

Lithium diisopropylamide may be used instead of butyllithium because it has the advantage of being a hindered compound as compared to butyl lithium and thus may be expected to have a lesser tendency to react with the carbonyl group of the anthraquinone. If desired the reaction solvent e.g. tetrahydrofuran can be replaced by a higher boiling solvent e.g. diglyme. Preferably such replacement solvent also has the advantage (possessed by diglyme) of forming an azeotropic mixture with water thus facilitating removal of the water formed during the condensation reaction and driving the reaction to higher yields.

The invention also extends to lithium salts of diaminoanthracene whether substituted or not.

In addition to the utility of these materials in the present reaction systems they may have utility as an intermediate or a starting material in other reaction systems.

The present invention may be put into practice in various ways and a number of specific embodiments will be described to illustrate the invention with reference to the accompanying examples, which show a variety of polycondensation methods, and to the accompanying drawings in which.

Figure 4A:
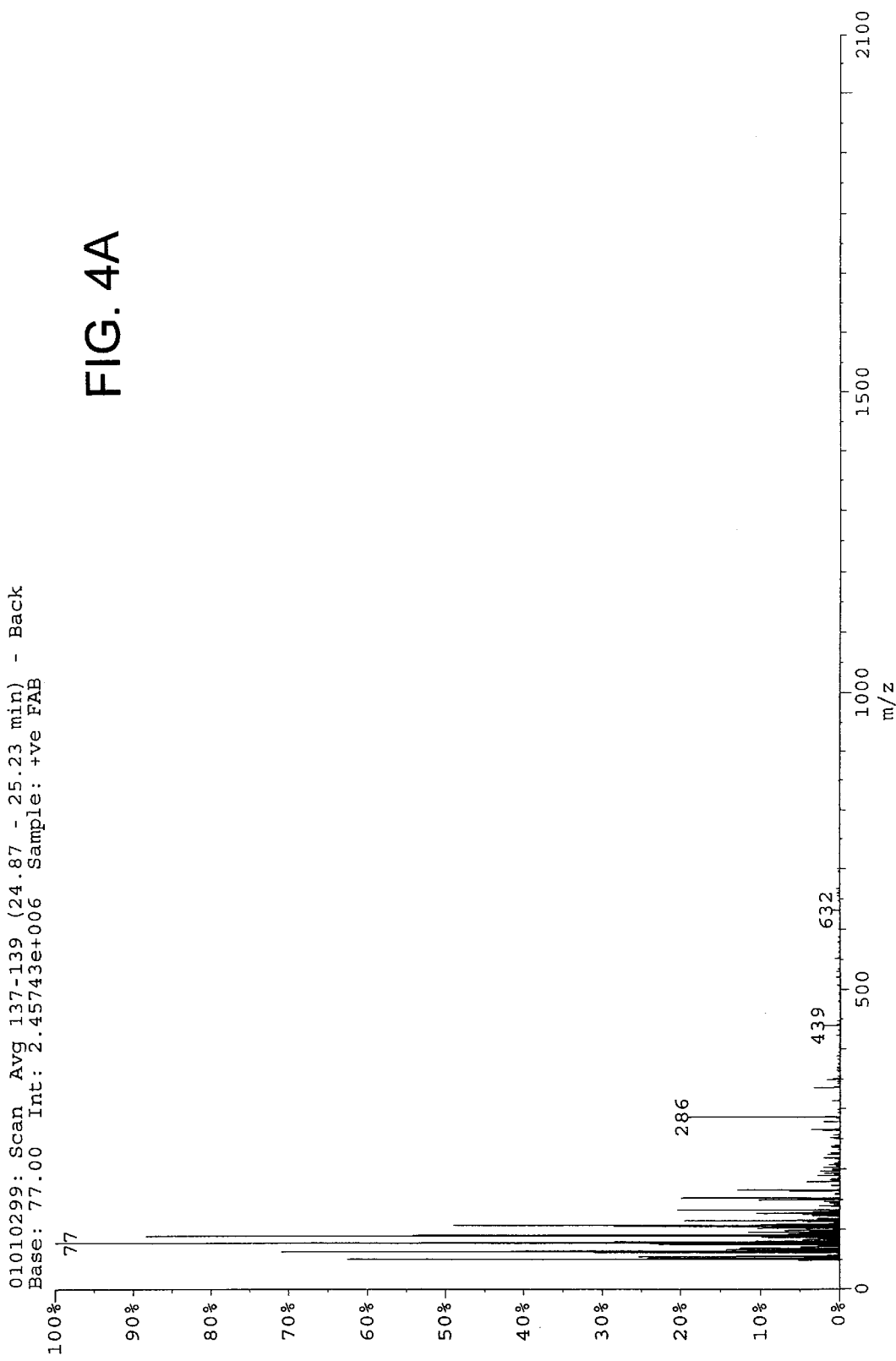
Figure 5:
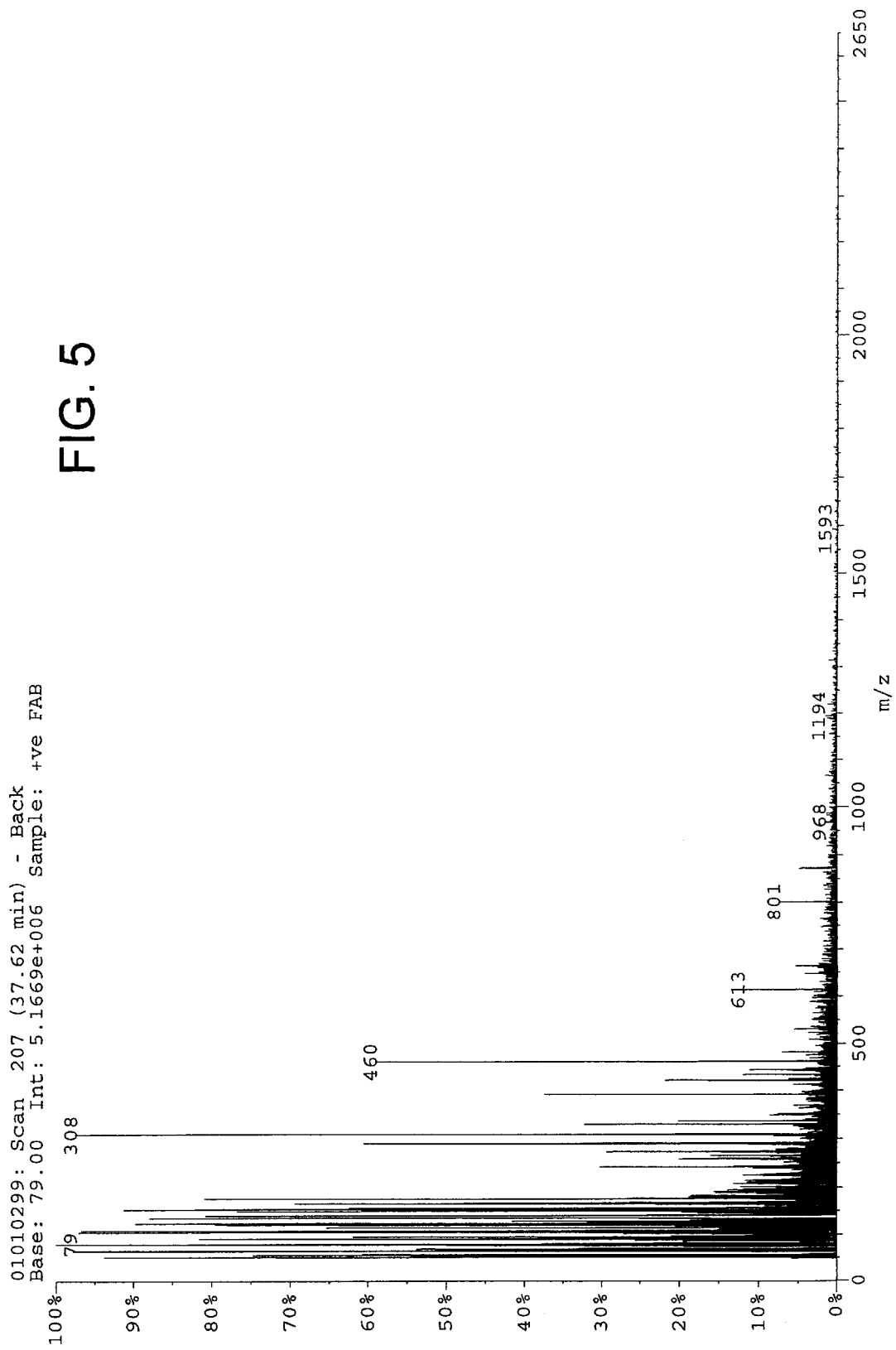
Figure 6B:
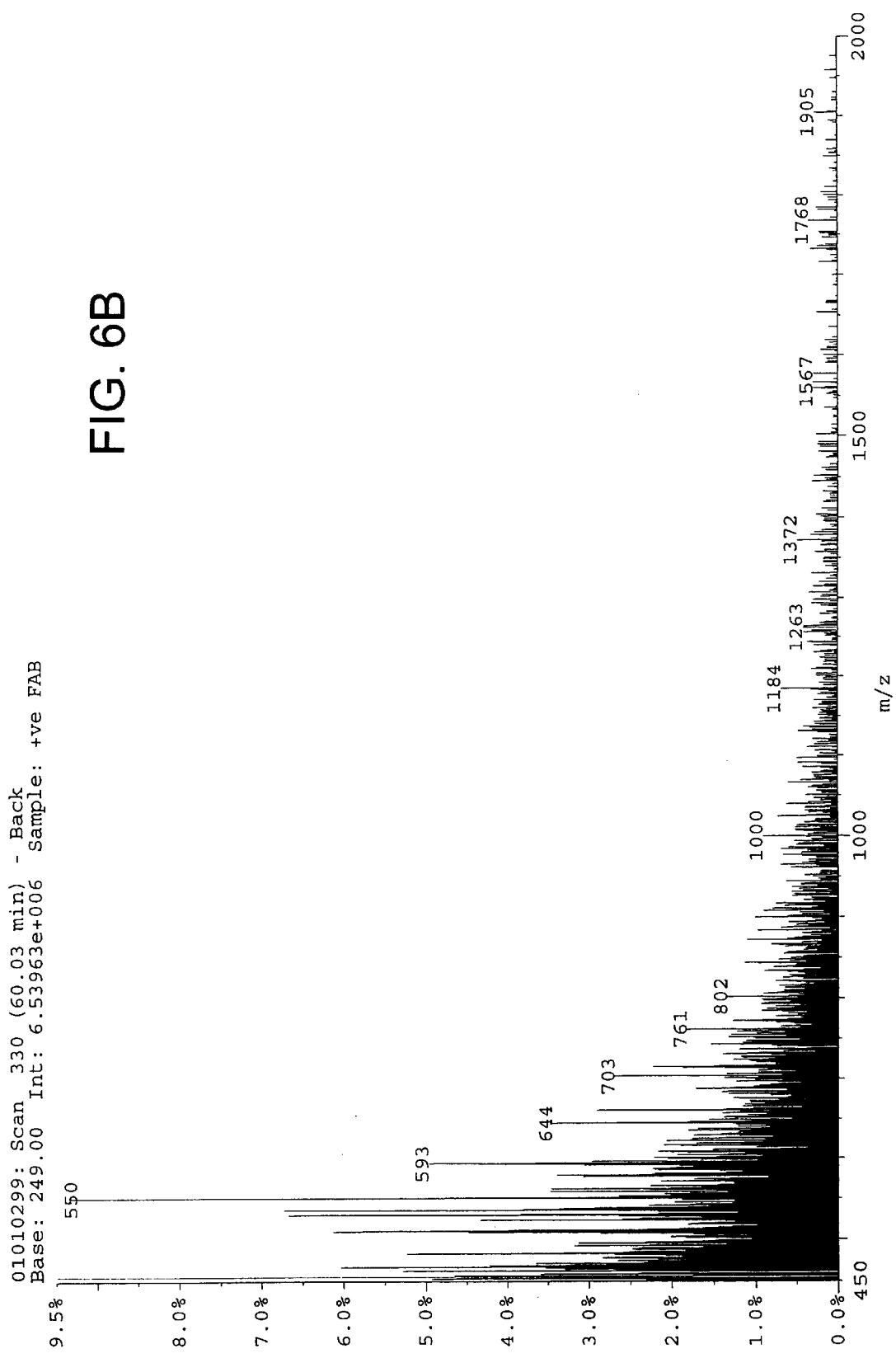
Figure 7B:
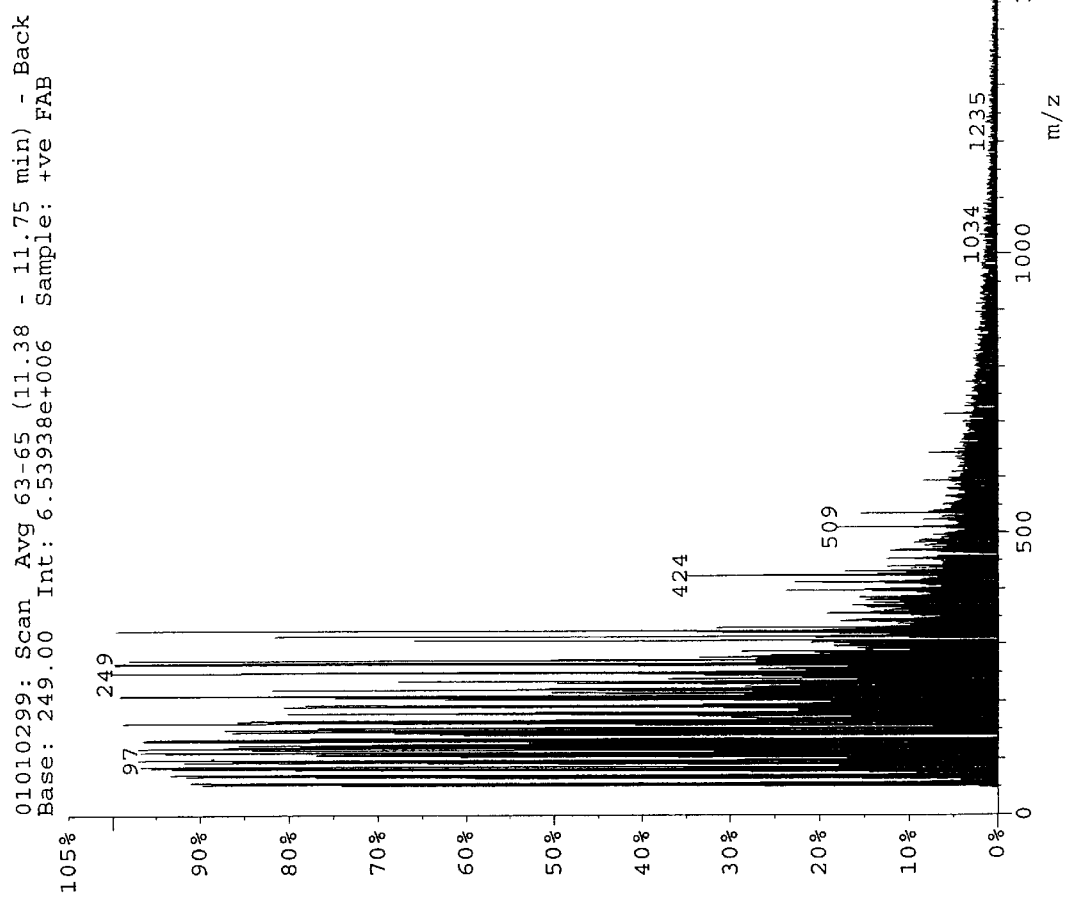
Figure 8A:
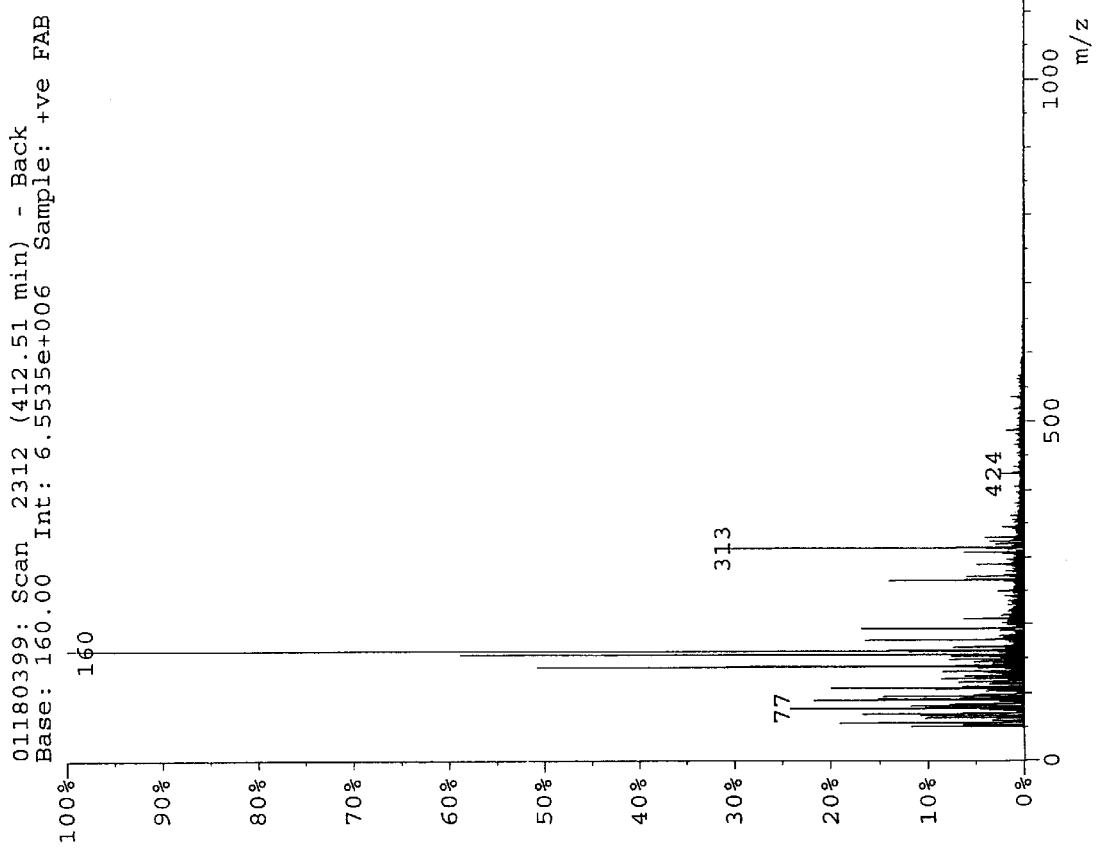
Figure 9:
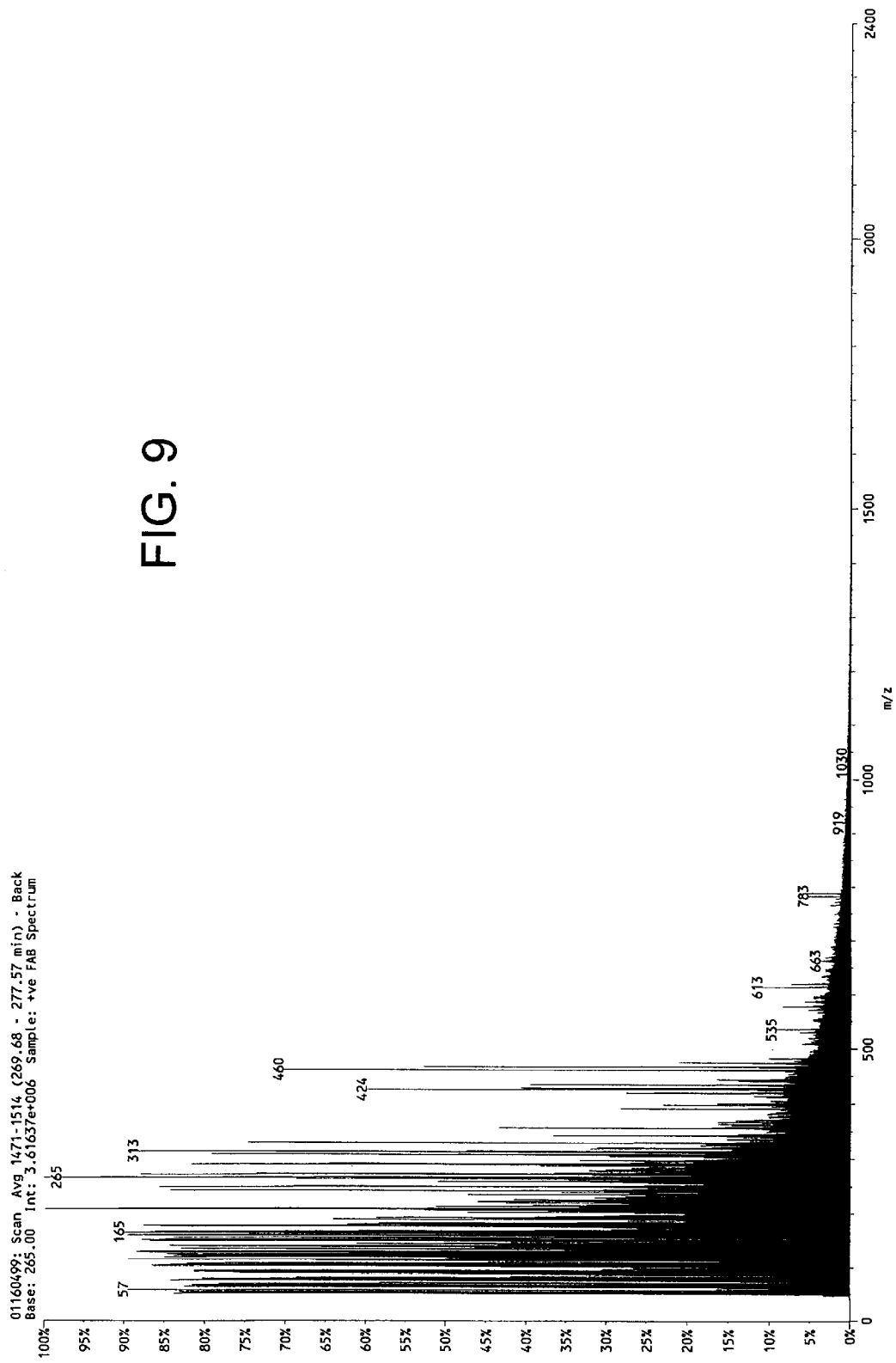

FIG. 4A is a mass spectra for the product of Example 4A taking the base peak as 77, FIG. 4B is the mass spectra for the product of Example 4A with an expanded intensity scale and taking the base peak as 77, FIG. 5 is a mass spectra for the product of example 4B1 taking the base peak as 79, FIG. 6A is a mass spectra for the product of Example 11A1 taking the base peak as 160, FIG. 6B is the mass spectra for the product of Example 11A1 with an expanded intensity scale and rebased taking the base peak as 249, FIG. 7A is a mass spectra for the product of Example 11A2 taking the base peak as 55, FIG. 7B is the mass spectra for the product of Example 11A2 rebased with the base peak taken as 249, FIG. 8A is a mass spectra for the product of Example 11B1 taking the base peak as 160, FIG. 8B is the mass spectra for the product of Example 11B1 rebased taking the base peak as 50, and FIG. 9 is a mass spectra for the product of Example 12 taking the base peak as 265.

The conductivity of the polymeric products was measured by the four-probe method on a standard disc of the sample co-polymer. This method is as follows. The powdered polymeric product is compressed into a thin pellet of uniform thickness. A linear spring loaded four probe conductivity cell was used to determine the conductivity. The outer two electrodes are used to measure the current (I), the voltage (V) being measured across the inner two. The volume conductivity is then calculated according to the following equation:

$$\text{resistivity} = \frac{1}{\text{conductivity}} = 4.532 \frac{V}{I} \times \text{thickness of pellet}$$

The four probe method is appropriate for measuring conductivities of the order of $10^{-6}$ S cm$^{-1}$ or higher i.e. $10^{-5}$ S cm$^{-1}$ and above but requires excessive voltages to be used for measuring lower conductivities in order to produce current values which can be accurately measured.

For such lower conductivities we use the standard two probe method. Here a cylindrical disc of the sample to be tested is made by compression of a powder of the material. The disc is located between two brass cylinder electrodes with their contact faces provided with platinum foil contact surfaces. The brass cylinders are of the same diameter as the sample disc. The disc and cylinders are enclosed in a screw threaded container which enables them to be urged into tight contact. A known current is passed through the array from face to face of the sample disc and the voltage drop is measured. The conductivity (σ) (sigma) can then be calculated from the equations:

$$R = V/I; \qquad R = \rho \times \frac{\text{length of disc}}{\text{cross section area of disc}}$$

$$\sigma = \frac{1}{\rho} \, S\text{cm}^{-1}$$

The two probe method involves higher contact resistance than the four probe method and accordingly the four probe method is preferable.

All mass spectra results given herein were carried out using the fast atomic bombardment method.

The mass spectra measurements were carried out by the fast atomic bombardment method (FAB) using a VG ZAB 2SE machine running FAB with a Xenon saddle field fast atom gun. The matrix was MNOBA.

The m/e values given below in the examples relate to the fragments which can be produced by break up of the polymer molecules including single, double. triple and longer repeat units. Each of the mass spectra given indicate that polymeric species were present.

Some of the mass spectra have the scale of the intensity expanded so as to reveal the more rare fragments. Others of the mass spectra have been rebased i.e in some cases the most frequently occurring fragment is taken as having 100% intensity ie as the base peak; in other cases a less frequently occurring fragment e.g. a smaller one may be taken to have 100% intensity and the other peaks are recalculated on the new base peak.

EXAMPLE 1

Preparation Of Diaminoanthracene

This can be prepared by the procedure of Schiedt (J. fur Praktische Chemie N. F. Band 157, 1941, p. 203–224 at 218) as follows:

20 g of anthraquinone was heated at boiling point with 200 ml formamide for 4 hours. The supernatent anthraquinone slowly disappeared while yellow crystals deposited. The solution was cooled, suction filtered and washed thoroughly with alcohol. The resultant 9,10-diformylaminoanthracene was recrystalized from formamide giving long yellow crystals mpt 439° C. Chemical analysis for $C_{16}H_{12}O_2N_2$ was calculated N 10.60%, found N10.88%. 40 g of KOH was dissolved in 100 ml of methanol and 10 g of the 9,10 diformylaminoanthracene prepared above was added and formed a deep red brown solution. This was heated at boiling point for one hour, when red glistening crystals separated.

The solution was cooled, suction filtered with the exclusion of air and the crystals washed with methanol. The crystal mass was dissolved in acetone, filtered as necessary and the filtrate carefully mixed with petroleum ether to deposit 9,10 diaminoanthracene as glistening flakes. Recrystalization from acetone gave deep red crystals. Chemical analysis for $C_{14}H_{12}N_2$ was calculated C 80.75%, H 5.81%, N 13.44% found C 81.06%, H 5.18%, N 12.47%.

EXAMPLE 2

Polymerisation of anthraquinone with 9,10-diaminoanthracene Using titanium tetrachloride ($TiCl_4$)

9,10-diaminoanthracene (1.0 g; 4.8 mmol) and Dabco (3.23 g; 28.8 mmol) were dissolved in 20 ml of orthodichorobenzene (o-DCB) while heating at 90° C. Then titanium tetrachloride (7.2 mmol) in 10 ml of orthodichlorobenzene was added dropwise and then an additional 10 ml of the solvent was added into the system. Then anthraquinone (0.99 g; 4.8 mmol) was added to the mixture and an extra 20 ml of the solvent was added. The reaction mixture was refluxed for 24 hours and then the precipitate was filtered off.

The precipitate was then washed thoroughly with hot orthodichlorobenzene to dissolve the soluble polymer and transfer it into the filtrate. Orthodichlorobenzene was removed from the filtrate under vacuum and the remaining product was purified by dissolving in chloroform and then precipitating it with hexane. This precipitate was treated with methanol and the soluble fraction filtered off to leave a dark green/black precipitate.

The yield of the green/black precipitate was 58%.

Its conductivity was of the order of $10^{-5}$ S cm$^{-1}$ measured by the four probe method.

EXAMPLE 3

Polymerisation by polycondensation of anthraquinone with 9,10-diaminoanthracene Using glacial acetic acid 9,10-diaminoanthracene (prepared as in Example 1) (5 g; 24 mmol) was dissolved in 100 ml of glacial acetic acid and anthraquinone (5 g; 24 mmol) was added. The mixture was refluxed for three hours at 116° C. The resultant dark green precipitate was filtered off. This precipitate was washed with distilled water and dried in a vacuum oven. The yield was 74%. The electrical conductivity of this product was $10^{-6}$ to $10^{-5}$ S cm$^{-1}$ as measured by the standard four probe method described above.

Mass spectra analysis by fast atomic bombardment of this product gave the following values (m/e), 209(100), 354(25), 764(2), 1143(2), 1350(1), 1541(0.4), 1790(0.3), 1980(0.4), 2231(0.2), 2525(0.2). This indicates a molecular weight of the order of 2525 representing 12 repeating units.

Mass spectra analysis by fast atomic bombardment is a standard procedure. The sample to be tested is dissolved in a solvent and injected into a tube. This dispersed sample is bombarded with ionised xenon producing fragments of the molecules present in the dispersed sample which fragments are ionized, a spectrum of ions of different mass thus being produced. The number outside the brackets, e.g. 209 in 209 (100) above, is the mass of the fragment. The numbers of each fragment of the same mass is summed and the total of the figure inside the brackets i.e. 100 in 209 (100) is called the intensity. An intensity of (100) is the frequency of occurrence of the most stable ionized fragment which may be the monomeric species, the so called "base peak".

The mass of DAA is 208, so that in this case the "base peak" is close to the monomeric species. The low intensity values e.g. (0.2), indicate the largest species detected and since masses greater than about 2000–2500 are not readily detected by this form of mass spectral analysis, these low intensity values indicate that even larger species can be expected to exist.

EXAMPLE 4A

Figure 3:
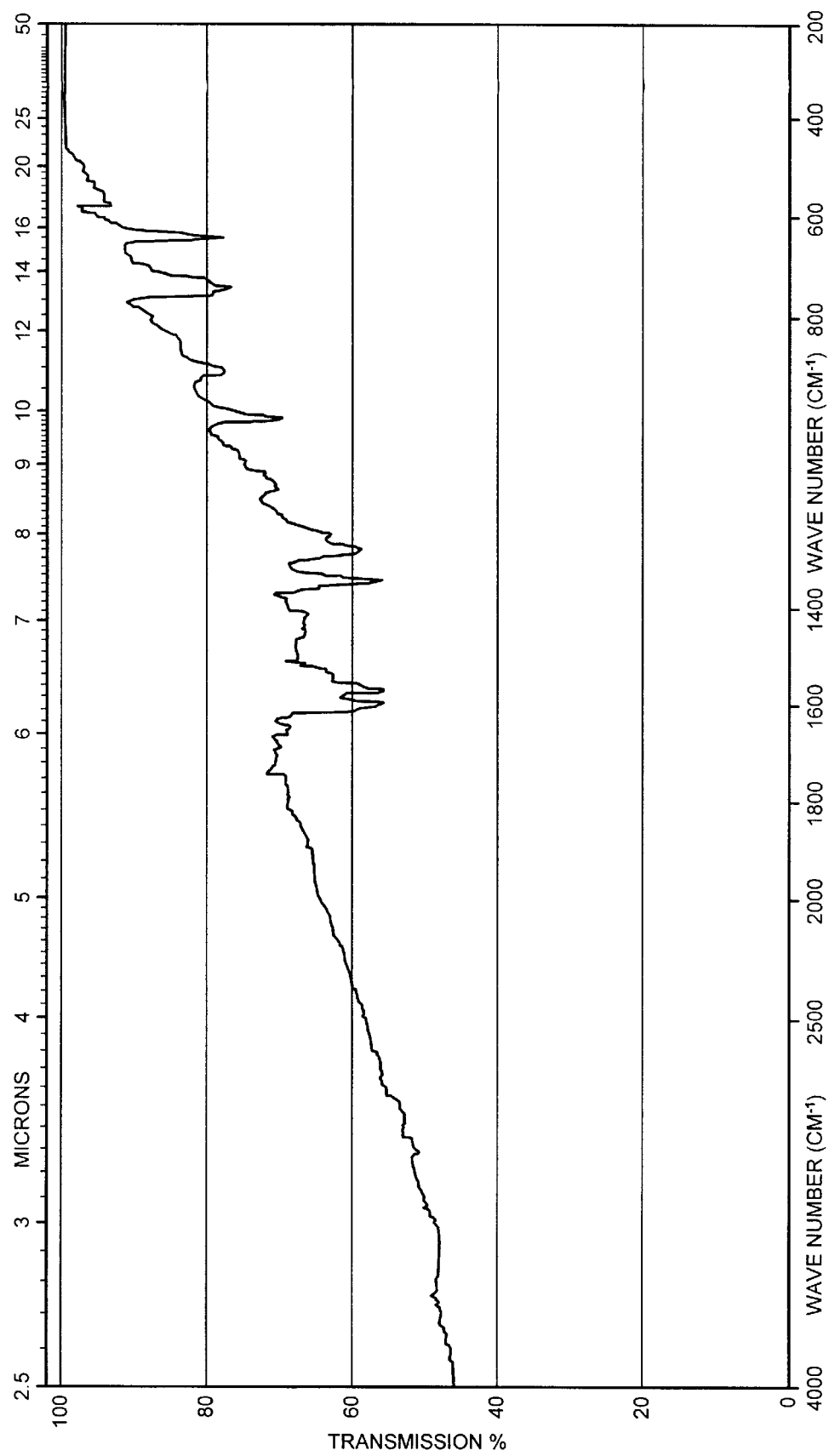
FIG. 3 is an IR spectra for the product of example 4A.

Polycondensation of 2-tert-butylanthraquinone with 9,10 diaminoanthracene Using orthodichlorobenzene 2-Tert-butylanthraquinone (1 g; 3.78 mmol) in 4 ml of orthodichlorobenzene was added to a solution of 9,10 diaminoanthracene (1 g; 4.8 mmol) in 25 ml of orthodichlorobenzene. The mixture was refluxed for 17 hours resulting in a liquid and a black precipitate. The black precipitate was filtered off, thoroughly washed with acetone and dried. The yield was 47%. The electrical conductivity of this product was less than $10^{-10}$ S cm$^{-1}$ as measured by the two probe method. IR spectra measured on a KBr disc showed an imine peak at 1610 cm$^{-1}$ and no carbonyl peak. FIG. 3 is an IR spectra for this product.

Chemical analysis for $C_{32}H_{24}N_2$ was calculated C 88.07%, H 5.50%, N 6.42%, found C 76.04%, H 3.97%, N 7.25%, O 1.02%.

Mass spectral analysis of this product gave the following values (m/e) 77(100), 439(2.3), 632(0.7), 1073(0.1), 2115 (0.15)

FIGS. 4A and 4B are mass spectra for this product.

EXAMPLE 4B1

Example 4A was repeated using chlorobenzene instead of dichlorobenzene as the solvent and refluxing the mixture for 4 hours instead of 17 hours. The yield was 5%.

Chemical analysis for $C_{32}H_{24}N_2$ was calculated C 88.07%, H 5.50%, N 6.42%, found C 85.05%, H 4.18%, N 8.12%, O 1.26%.

Mass spectral analysis by fast atomic bombardment of this produce gave the following values (mle) 79 (100), 439 (4.1), 872(6), 1316 (0.3), 1747 (0.3), 2235 (0.2), 2463 (0.2).

FIG. 5 is a mass spectra for the product of this example.

EXAMPLE 4B2

The liquid fraction of the reaction mixture is thought to contain the soluble polymeric species from the reaction. The liquid fraction can be separated into the individual polymer and oligomer species or clusters of species of similar molecular weight by colurn chromatography using silica gel as the column adsorbent media and diethylether as the eluant solvent. This has been done and unreacted anthraquinone and unreacted DAA have been detected and two bands of polymeric species having different molecular weights as indicated by differing elution times have also been detected. Each band is thought to be a mixture of different polymeric species. The lower molecular weight band (probably oligomeric) consisted of about 1 gram; the higher molecular weight band (with the longer elution time (hold up time)) consisted of about 0.5 gram of solids.

The higher molecular weight fraction (band) exhibited a conductivity of $1\times10^{-5}$ S cm$^{-1}$ measured by the four probe method.

The higher molecular weight bands are separable into their individual components by fractionation with eluant solvents of increasing polarity. A series of eluants of increasing polarity which may be used is hexane (low polarity), toluene, diethylether, chloroform and methanol (high polarity).

EXAMPLE 5

Polymerisation of 2-ethylanthraquinone and 9,10 diaminoanthracene using titanium tetrachloride. Example 2 is repeated using 2-ethyl anthraquinone instead of anthraquinone.

EXAMPLE 6

Polymerisation of 2-methylanthraquinone and 9,10 diaminoanthracene Example 2 is repeated using 2-methylanthraquinone instead of anthraquinone

EXAMPLE 7

Polymerisation of 2,3-dimethylanthraquinone and 9,10-diaminoanthracene Example 2 is repeated using 2,3-dimethylanthraquinone instead of anthraquinone.

EXAMPLES 8–10

Polycondensation of anthraquinones and 9,10 diaminoanthracene Example 2 is repeated using sodium anthraquinone (Ex 8), 2,6-dioctyloxyanthraquinone (Ex 9) and 2,6-dihydroxyanthraquinone (Ex 10) instead of anthraquinone.

EXAMPLE 11A1

Synthesis of poly(anthraquinoneimine) using butyl-lithium as an initiator. A dry 100 ml round bottom flask containing a dry magnetic bar was connected to an inert gas system (nitrogen). 9,10 diaminoanthracene (1 g; 4.8 mmol) was dissolved in 25 ml of anhydrous tetrahydrofuran in the flask. The solution was cooled to about −100° C. in an acetone—liquid nitrogen bath. Once the system had been cooled down n-butyllithium solution (6.4 ml of a 1.5 M n-Bu Li solution in hexane; 9.6 mmol) was added slowly via a syringe while the solution was stirred under a positive pressure of nitrogen.

Once the whole amount of n-BuLi had been added the solution was allowed to warm up to 0° C. over about 20 minutes and then this reaction mixture was added to a solution of 2-tert-butylanthraquinone dissolved in 10 ml of tetrahydrofuran (1 g; 3.8 mmol).

The whole system was then allowed to warm up to room temperature while stirring over about 15 minutes and kept at room temperature for 1 hour.

The precipitate which was formed was filtered off and washed with a small amount of methanol to remove the n-butyl-lithium salt. The yield was 41%.

IR spectra showed an imine peak at 1575 cm−1 (The imine peak can occur in the range 1620 to 1575 and is the C=N stretching frequency, the value varying depending on the environment of the bond.). The IR spectra also showed a carbonyl peak at 1670 cm−1, thought to be due to the presence of unreacted 2-tert butyl anthraquinone.

The product was light green in colour.

Its conductivity was $2.0\times10^{-5}$ S cm-1 as measured by the four probe method.

Mass spectra analysis of this product gave the following values (m/e) 160 (100) 425(6), 439(3.4), 1000(1.2), 1184(1), 1567(0.4), 1905(0.3), 1980(0.2).

FIGS. 6A and 6B are mass spectra for this product.

EXAMPLE 11A2

The liquid fraction was evaporated to dryness and chemical analysis carried out for $C_{32}H_{24}N_2$ calculated C 88.07%, H 5.50%, N 6.42% found C 75.55%, H 5.60%, N 5.38%.

Mass spectra analysis by fast atomic bombardment of the product gave the following values (m/e) 55 (100), 431 (1.0), 1034 (2.5), 1235 (1.5), 2650 (0.1).

FIGS. 7A and 7B are mass spectra for this product.

EXAMPLE 11B1

Example 11A1 was repeated except that the final reaction step was refluxing for 5 hours instead of holding at room temperature for 1 hour. The precipitate was produced in 50% yield. Mass spectra analysis by fast atomic bombardment gave the following values (m/e) 160 (100), 313 (33), 424 (2.0), 1548 (2.0), 1820 (1.0), 2041 (0.5). FIGS. 8A and 8B are mass spectra for this product.

The mass of 1548 represents 7 repeat units; that of 1820, 8 repeat units; and that of 2041, 9 repeat units. The calculated molecular weight of a single repeat unit is 438, thus 424 may represent a single repeat-unit with one methyl group removed from the tert-butyl group. However the fragment represented by the mass 313 has not been identified.

EXAMPLE 11B2

The liquid fraction contained the remaining 50% of the reaction species and the soluble polymer species.

EXAMPLE 11C

In a modified version of the procedure of example 11A or 11B the cooling is done with a solid carbon dioxide/acetone mixture to achieve a temperature of −70° C. to −80° C.

Figure 1:
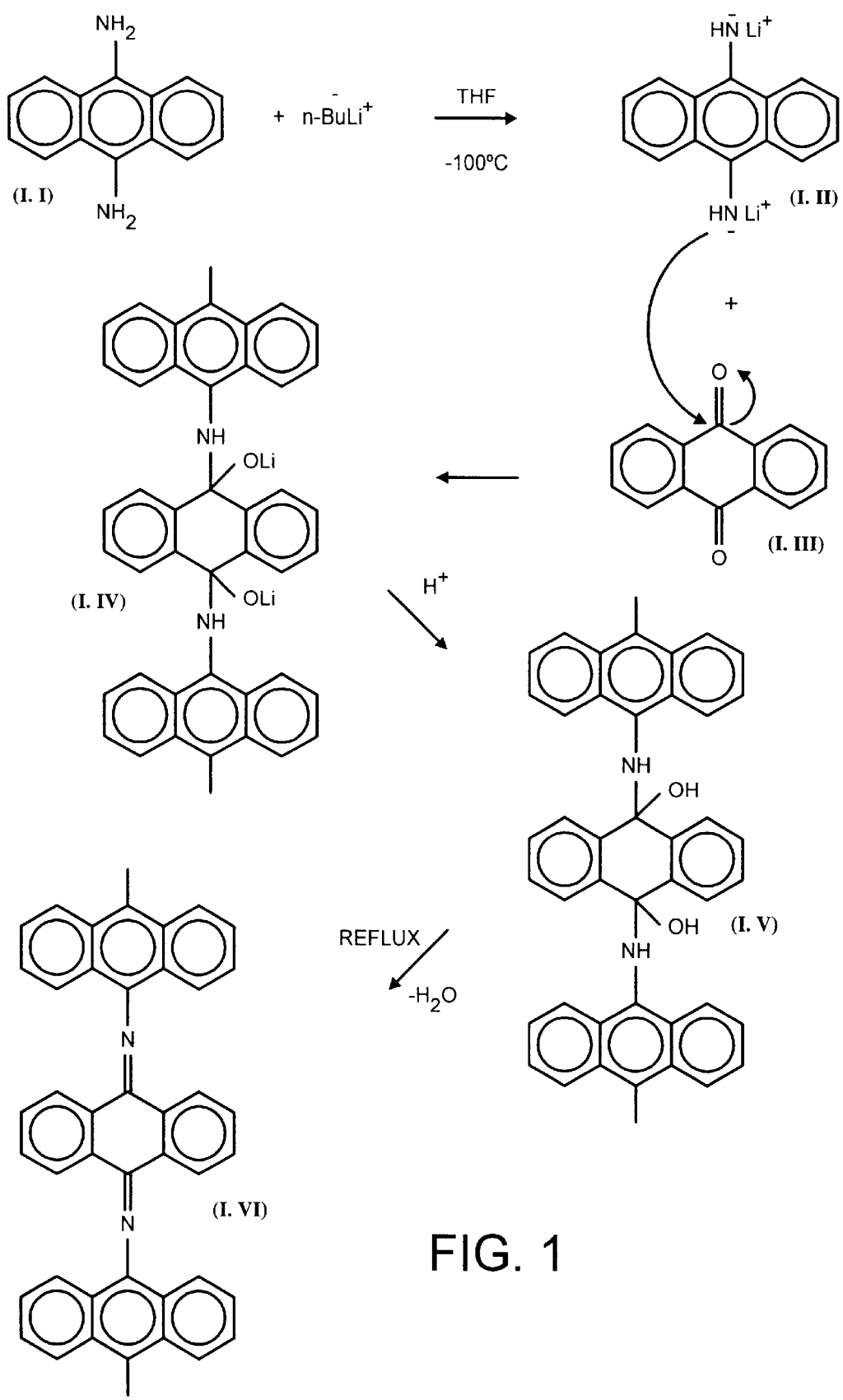
FIG. 1 is a reaction scheme for Example 11.
Figure 2:
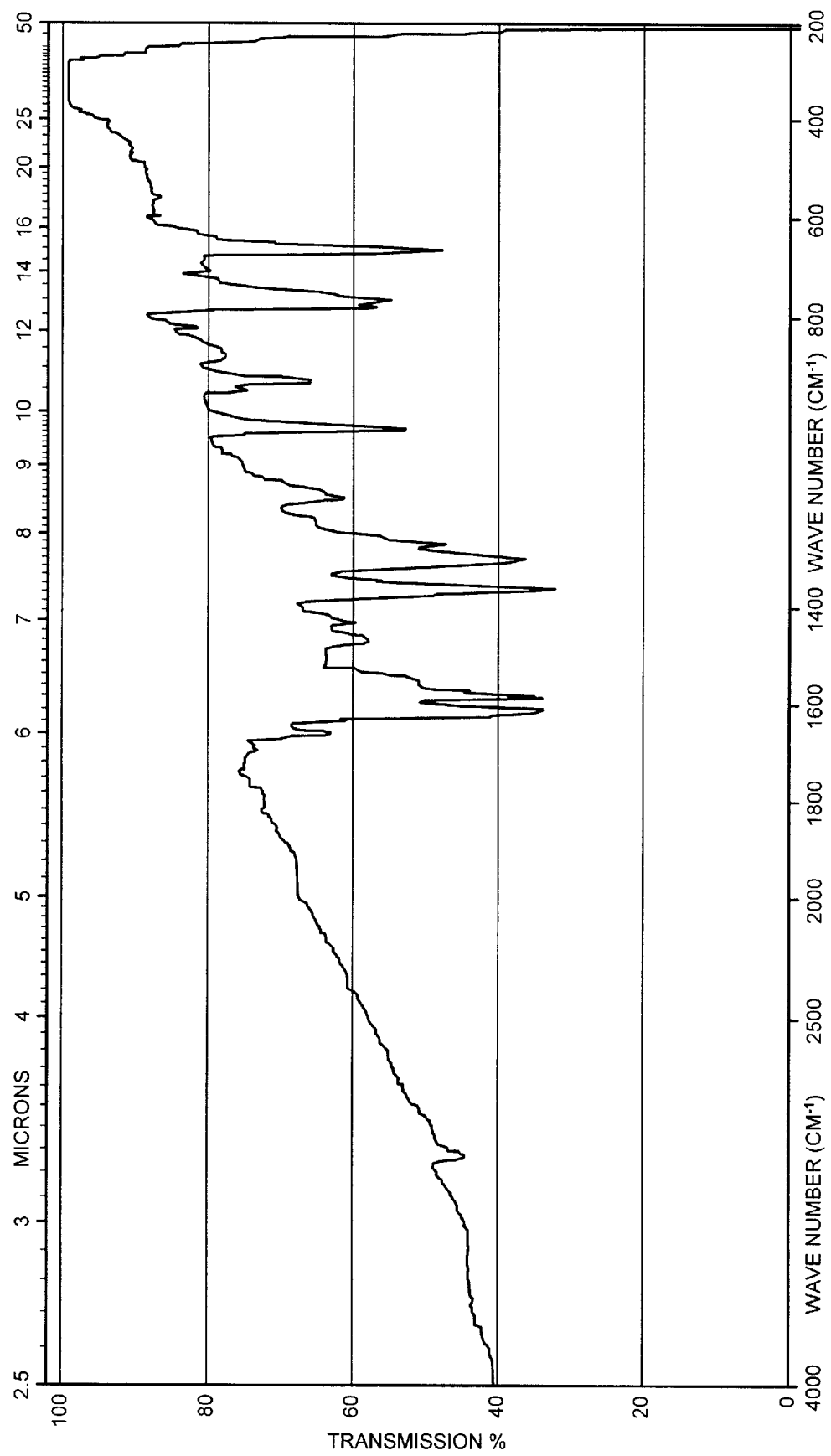
FIG. 2 is an IR spectra for the product of Example 4B.

Attached as FIG. 1 is a reaction scheme which is believed to set out what occurs in the procedure of Example 11. FIG. 1 is a theoretical explanation of what is believed to be occurring but the invention is not dependent on the accuracy or otherwise of the reaction scheme shown in FIG. 1.

In FIG. 1 compound 1.1 is 9,10 diaminoanthracene which on reaction with n-BuLi produces a diaminoanthracene dilithium salt compound I.II. This reacts with AQ (compound I.III) to form a transient intermediate compound (I.IV) which in the presence of the protons released during the reaction between I.II and I.III relinquishes the Lithium atoms to form compound (I.V). This on refluxing loses water to produce the poly(anthraquinonimine) compound (I.VI).

EXAMPLE 12

Example 11 is repeated but replacing the tetrahydrofuran as the reaction medium by diglyme (2-methoxy ethyl ether) by adding diglyme to the reaction mixture at the stage of formation of compound I.II and I.III and distilling off the tetrahydrofuran. Compound I.V was refluxed in the presence of benzene so as to remove the water produced as the benzene/water azeotropic mixture, so as to produce compound I.VI.

IR spectra showed peaks at 1665cm$^{-1}$ and 1580cm$^{-1}$, the former value is characteristic of C=C aromatic bonds and the latter value is the imine peak.

The conductivity of the product was of the order of 10$^{-5}$ S cm$^{-1}$ as measured by the four probe method. Mass spectral analysis of the product gave the following values (m/e) 265(100), 424(8), 535(13), 696(2.0), 941(1.0) 1337(0.3), 1842(0.1), 1960(0.1)2214(0.1). FIG. 9 is the mass spectra for this product.

EXAMPLE 13

Reduction With NaBH$_4$

The polymeric products of Examples 2 to 12 are reduced with sodium borohydride in methanol (reflux 18 hours) to give the partially reduced polymer.

What is claimed is:

1. A polymeric or oligomeric product prepared by a process comprising reacting anthraquinone with diaminoanthracene wherein the anthraquinone or diaminoanthracene may be substituted or unsubstituted.

2. The product according to claim 1, wherein the product is a homopolymer or homo-oligomer.

3. The product according to claim 1, wherein the product is a co-polymer or a co-oligomer.

4. The product according to claim 1, wherein the diaminoanthracene is a 9,10-diaminoanthracene.

5. The product according to claim 1, wherein the anthraquinone comprises general formula (I):

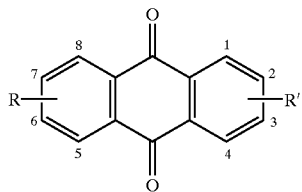

(I)

where, R may be the same as or different than R', and may be a hydrogen atom when R=R'=H, the compound is anthraquinone, or CH$_3$, CH$_3$CH$_2$—, —OCH$_3$, —OCH$_2$CH$_3$, —CH$_2$OCH$_3$, —CH$_2$OCH$_2$CH$_2$OCH$_3$, methoxyethoxyethoxymethyl, aryloxymethyl, phenyl, Cl, Br, CN or NO$_2$, —CH$_2$COOR or —CH$_2$NHCOR" where R" is C1–C6 alkyl or a phenyl or biphenyl group.

6. The product according to claim 1, wherein the ratio of anthraquinone to diaminoanthracene is from 5:1 to 1:5.

7. The product according to claim 1, wherein the ratio of anthraquinone to diamine anthracene is from 3:1 to 1:3.

8. The product according to claim 1, wherein the ratio of anthraquinone to diaminoanthracene is from 2:1 to 1:2.

9. The product according to claim 1, wherein the anthraquinone is selected from the group consisting of C$_1$–C$_6$ alkyl anthraquinone, C$_1$–C$_{10}$ alkoxy anthraquinone, and hydroxyanthraquinone.

10. The product according to claim 1, wherein the anthraquinone is selected from the group consisting of 2-ethyl anthraquinone, 2-methyl anthraquinone, 2,3-dimethyl anthraquinone, 2,6-dioctyloxy anthraquinone, and 2,6-dihydroxyanthraquinone.

11. The product according to claim 1, wherein said product comprises general formula (II)

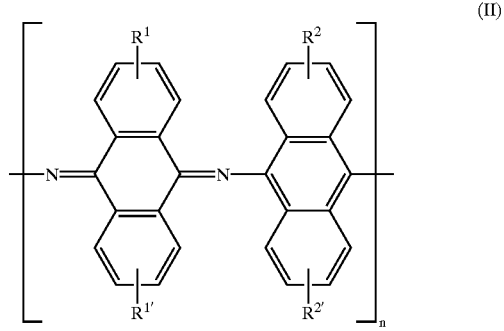

where, R$^1$ may be the same as or different than R$^{1'}$, which may be the same as or different than R$^2$, which may be the same as or different than R$^{2'}$ and each of R$^1$, R$^{1'}$, R$^2$, and R$^{2'}$ is a hydrogen atom or CH$_3$, CH$_3$CH$_2$, —OCH$_3$—OCH$_2$CH$_3$, CH$_2$OCH$_3$, —CH$_2$OCH$_2$CH$_2$OCH$_3$, methoxyethoxyethoxymethyl, aryloxymethyl, phenyl, Cl, Br, CN or NO$_2$, —CH$_2$COOR or —CH$_2$NHCOR" where R" is C$_1$–C$_6$ alkyl or a phenyl or biphenyl group, or a C$_1$–C$_5$ alkyl group, or an aryl group, or an —SO$_3$H group or a hydroxyl group or a C$_1$–C$_5$ alkoxy group or an H$_2$PO$_3$ group, and R$^1$ and R$^{1'}$ are different to R$^2$ and R$^2$ and n is an integer ranging from 2 to 100.

12. The product according to claim 1, wherein said product comprises general formula (II)

(II)

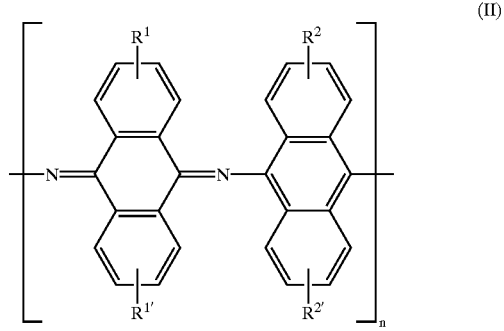

where, R$^1$ may be the same as or different than R$^{1'}$, and each of R$^1$ and R$^{1'}$ is a hydrogen atom or CH$_3$, CH$_3$CH$_2$, —OCH$_3$, —OCH$_2$CH$_3$, —CH$_2$OCH$_3$, —CH$_2$OCH$_2$CH$_2$OCH$_3$, methoxyethoxyethoxymethyl, aryloxymethyl, phenyl, Cl, Br, CN or NO$_2$, —CH$_2$COOR or —CH$_2$NHCOR'" where R'" is C$_1$–C$_6$ alkyl or a phenyl or biphenyl group, and R$^2$ may be the same or different than R$^{2'}$ and each of R$^2$ and R$^{2'}$ is a hydrogen atom or a C$_1$–C$_5$ alkyl group, or an aryl group, or an —SO$_3$H group or a hydroxyl group or a C$_1$–C$_5$ alkoxy group or an H$_2$PO$_3$ group, and R$^1$ and R$^{1'}$ are different to R$^2$ and R$^{2'}$ and n is an integer ranging from 2 to 100.

13. The product according to claim 11, wherein R$^1$ is the same as R$^{1'}$ but is different from R$^2$ and R$^{2'}$ and wherein R$^2$ and R$^{2'}$ are the same.

14. The product according to claim 11, wherein R$^1$ is the same as R$^{1'}$, R$^2$, and R$^{2'}$, but is not hydrogen.

15. The product according to claim 11, wherein R$^1$ is different from R$^{1'}$, and R$^2$ is different from R$^{2'}$, and R$^1$ and R$^{1'}$ are both different from R$^2$ and R$^{2'}$.

16. The product according to claim 11, wherein R$^1$ and R$^2$ are not hydrogen and wherein R$^{1'}$ and R$^{2'}$ are not the same.

17. The product according to claim 1, wherein the oxidation state is from 0.25 to 0.75, and a formula (III) at an oxidation state 0.25, a formula (IV) at an oxidation state 0.5 and a formula (V) at an oxidation state 0.75 as follows:

(III)
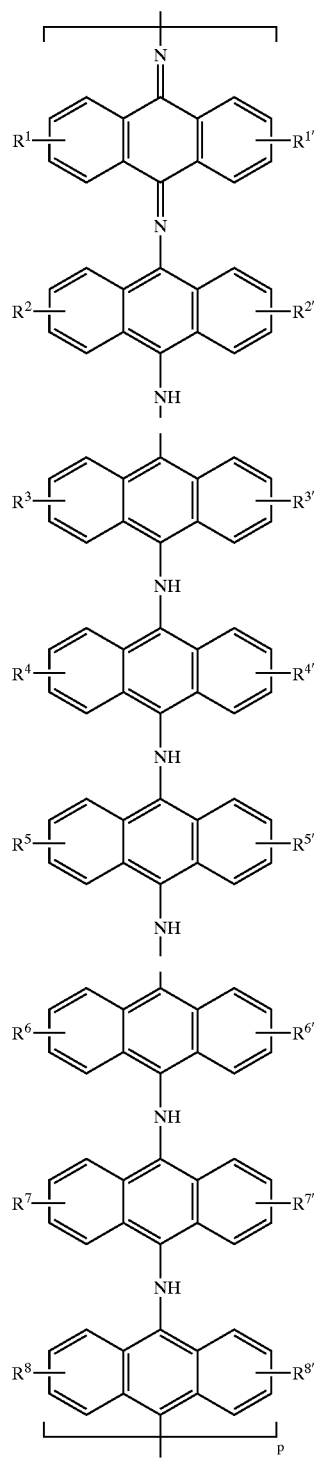
(IV)
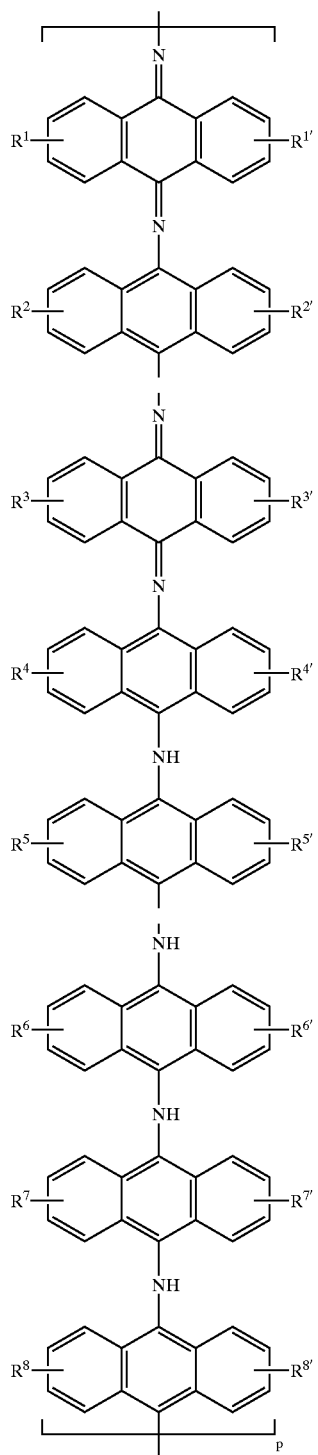

-continued

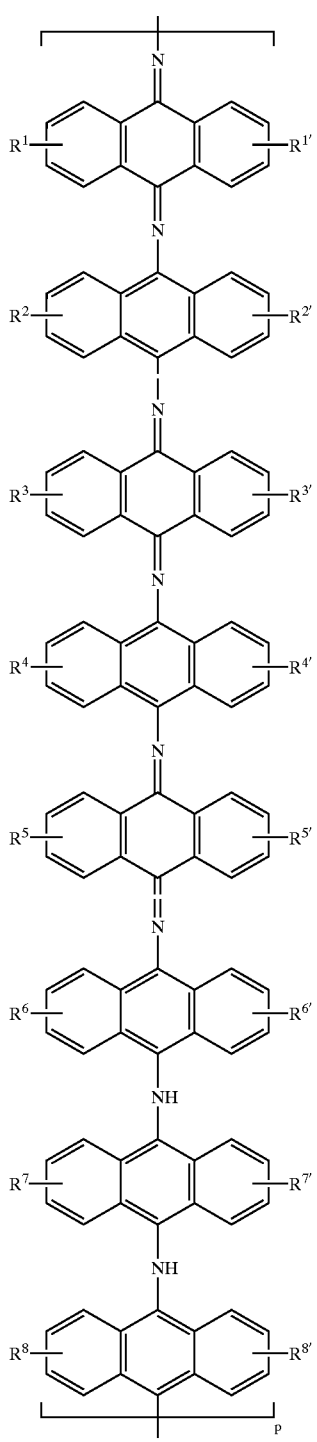

(V)

wherein $R^1$ to $R^8$ are not all hydrogen, and $R^1$, $R^3$, $R^5$ and $R^7$ and $R^{1'}$, $R^{3'}$, $R^{5'}$ and $R^{7'}$ are the same as $R^1$ and $R^{1'}$ as defined in connection with formula (II), and $R^2$, $R^4$, $R^6$ and $R^8$ and $R^{2'}$, and $R^{4'}$, and $R^{6'}$ and $R^{8'}$ are the same as $R^2$ and $R^{2'}$ as defined in connection with formula (II) and p is an integer ranging from 10 to 100.

18. The product according to claim 1, wherein the oxidation state is from 0.25 to 0.75, and a formula (III) at an oxidation state 0.25, a formula (IV) at an oxidation state 0.5 and a formula (V) at an oxidation state 0.75 as follows:

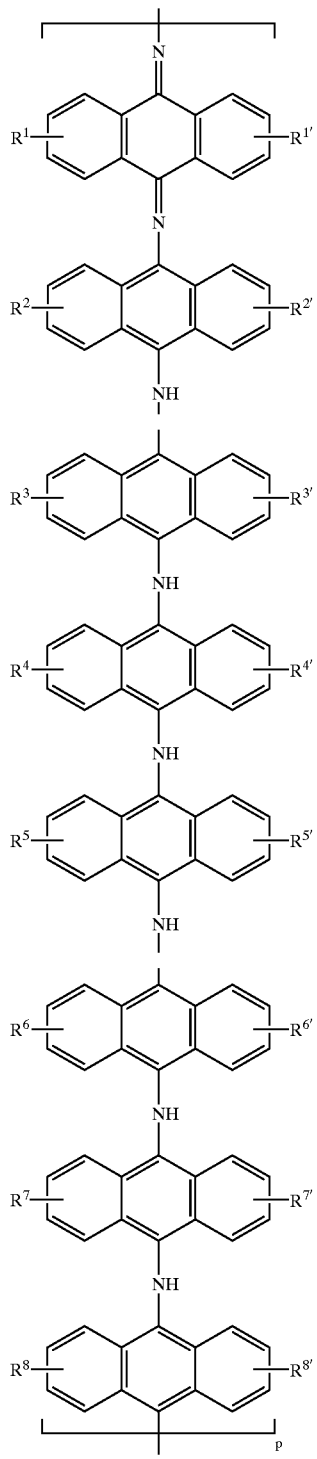

(III)

-continued
(IV)
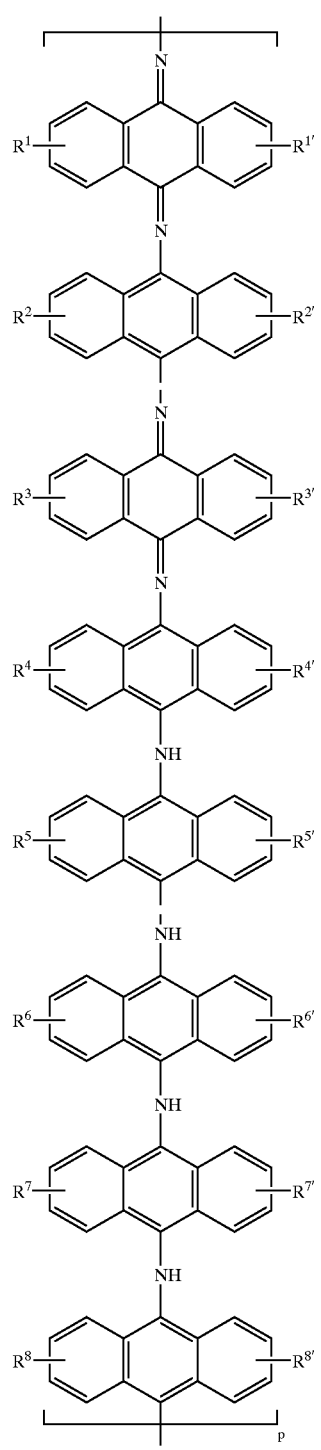
(V)
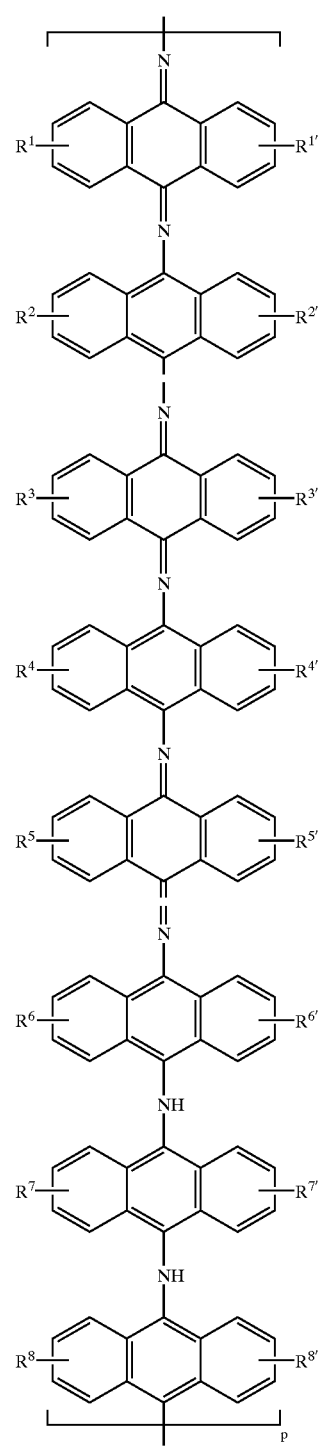

wherein the R groups are the same as the R' groups and the R groups are all the same;

or the R groups are the same as the R' groups and the $R^1$, $R^2$, $R^3$, and $R^5$ and $R^7$ groups are all the same and the $R^2$, $R^4$, $R^6$ and $R^8$ groups are all the same but are different than the $R^1$, $R^3$, $R^5$ and $R^7$ groups;

or the R groups are different than the R' groups and the $R^1$, $R^3$, $R^5$ and $R^7$ groups are all the same and the $R^2$, $R^4$, $R^6$ and $R^8$ groups are all the same but are different than the $R^1$, $R^3$, $R^5$ and $R^7$ groups, and $R^1$, $R^3$, $R^5$ and $R^7$ and $R^{1'}$, $R^3$, $R^5$ and $R^7$ are the same as $R^1$ and $R^{1'}$ as defined in connection with formula (II), and $R^2$, $R^4$, $R^6$ and $R^8$ and $R^{2'}$, and $R^{4'}$, and $R^{6'}$ and $R^{8'}$ are the same as $R^2$ and $R^{2'}$ as defined in connection with formula (II) and p is an integer ranging from 10 to 100.

19. a method for the production of a homopolymer, copolymer, homo-oligomer or co-oligomer product comprising a condensation reaction of anthraquinone with diaminoanthracene wherein the anthraquinone or diaminoanthracene may be substituted or unsubstituted.

20. The method according to claim 19, wherein said condensation further comprises a titanium compound.

21. The method according to claim 20, wherein the titanium compound is selected from the group consisting of titanium tetrachloride and titanium alkoxide.

22. The method according to claim 19, comprising
(a) dissolving the diaminoanthracene in a suitable solvent;
(b) heating the mixture in the presence of a titanium compound;
(c) adding an anthraquinone compound to the mixture;
(d) stirring and heating the mixture;
(e) filtering the mixture to obtain a residue,
(f) washing the residue; and
(g) purifying the product.

23. A transparent electroconductive coating comprising a polymeric or oligomeric product prepared by reacting anthraquinone with diaminoanthracene, wherein said anthraquinone or diaminoanthracene is substituted or unsubstituted.

24. A static shielding material comprising a polymeric or oligomeric product prepared by reacting anthraquinone with diaminoanthracene, wherein said anthraquinone or diaminoanthracene is substituted or unsubstituted.

25. The product according to claim 11, wherein n is from 10 to 100.

26. The product according to claim 11, wherein said aryl group is a benzyl group.

27. The product according to claim 12, wherein n is from 10 to 100.

28. The product according to claim 12, wherein said aryl group is a benzyl group.

29. The product according to claim 12, wherein $R^1$ is the same as $R^{1'}$ but is different from $R^2$ and $R^{2'}$ and wherein $R^2$ and $R^{2'}$ are the same.

30. The product according to claim 12, wherein $R^1$ is the same as $R^{1'}$, $R^2$, and $R^{2'}$, but is not hydrogen.

31. The product according to claim 12, wherein $R^1$ is different from $R^{1'}$, and $R^2$ is different from $R^{2'}$, and $R^1$ and $R^{1'}$ are both different from $R^2$ and $R^{2'}$.

32. The product according to claim 12, wherein $R^1$ and $R^2$ are not hydrogen and wherein $R^{1'}$ and $R^{2'}$ are not the same.

33. The method according to claim 21, wherein said titanium alkoxide is selected from the group consisting of titanium tetraisopropoxide and titanium tetra-n-butoxide.

34. The method according to claim 22, wherein said stirring and heating is performed for greater than 12 hours.

* * * * *